US010200656B2

(12) United States Patent
Lee et al.

(10) Patent No.: US 10,200,656 B2
(45) Date of Patent: Feb. 5, 2019

(54) DISPLAY APPARATUS AND VEHICLE INCLUDING THE SAME

(71) Applicant: LG ELECTRONICS INC., Seoul (KR)

(72) Inventors: Jaeho Lee, Seoul (KR); Kihyeon Kim, Seoul (KR)

(73) Assignee: LG Electronics Inc., Seoul (KR)

(*) Notice: Subject to any disclaimer, the term of this patent is extended or adjusted under 35 U.S.C. 154(b) by 385 days.

(21) Appl. No.: 15/050,590

(22) Filed: Feb. 23, 2016

(65) Prior Publication Data

US 2017/0054946 A1 Feb. 23, 2017

(30) Foreign Application Priority Data

Aug. 20, 2015 (KR) .................. 10-2015-0117587

(51) Int. Cl.
*B60R 1/00* (2006.01)
*B60R 1/06* (2006.01)
*H04N 7/18* (2006.01)

(52) U.S. Cl.
CPC ............... *H04N 7/18* (2013.01); *B60R 1/00* (2013.01); *B60R 2300/301* (2013.01);
(Continued)

(58) Field of Classification Search
CPC .......... G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06T 2207/30236;
(Continued)

(56) References Cited

U.S. PATENT DOCUMENTS 6,411,867 B1 * 6/2002 Sakiyama .............. B60Q 9/005
340/901
7,277,123 B1 * 10/2007 Okamoto .................. B60R 1/00
348/148
(Continued)

FOREIGN PATENT DOCUMENTS

CN 1344470 4/2002
CN 104349026 2/2015
(Continued)

OTHER PUBLICATIONS

Extended European Search Report in European Application No. 16156288.9-1503, dated Jan. 12, 2017, 7 pages (with English translation).

*Primary Examiner* — Nathnael Aynalem
(74) *Attorney, Agent, or Firm* — Fish & Richardson P.C.

(57) ABSTRACT

A display apparatus with an around-view monitor function includes a camera configured to acquire an image by capturing an image of a view around a vehicle, a memory configured to store the captured image, and a processor. The processor is configured to, based on the captured image of the view around the vehicle, fix a view point for the around-view monitor function, designate a viewing area at the fixed view point for the around-view monitor function, and generate a fixed around-view monitor image representing the viewing area at the fixed view point. The display apparatus also includes a display unit configured to display the fixed around-view monitor image.

22 Claims, 30 Drawing Sheets

(52) U.S. Cl.
CPC ... *B60R 2300/303* (2013.01); *B60R 2300/607* (2013.01); *B60R 2300/804* (2013.01); *B60R 2300/806* (2013.01); *B60R 2300/8026* (2013.01)

(58) Field of Classification Search
CPC . G06T 2207/30248; G06T 2207/30252; G06T 2207/30256; G06T 2207/30261; G06T 2207/30264; G06T 2207/30268; B60R 2300/806; G08G 1/16
See application file for complete search history.

(56) References Cited

U.S. PATENT DOCUMENTS

| | | | | |
|---|---|---|---|---|
| 7,307,655 | B1* | 12/2007 | Okamoto | G06K 9/00791 348/222.1 |
| 9,558,546 | B2* | 1/2017 | Hayakawa | H04N 7/183 |
| 9,852,635 | B2* | 12/2017 | Fukuda | G08G 1/167 |
| 2006/0287826 | A1* | 12/2006 | Shimizu | B60K 35/00 701/431 |
| 2008/0100472 | A1* | 5/2008 | Mizusawa | B60R 1/00 340/932.2 |
| 2010/0238051 | A1* | 9/2010 | Suzuki | B60R 1/00 340/932.2 |
| 2011/0001826 | A1 | 1/2011 | Hongo | |
| 2013/0063601 | A1* | 3/2013 | Wakabayashi | B60R 1/00 348/148 |
| 2014/0119597 | A1 | 5/2014 | Sung et al. | |
| 2014/0354452 | A1* | 12/2014 | Okuyama | B62D 15/028 340/932.2 |
| 2015/0015712 | A1* | 1/2015 | Sempuku | G08G 1/165 348/148 |
| 2015/0204687 | A1* | 7/2015 | Yoon | G01C 21/3658 701/436 |
| 2016/0272244 | A1 | 9/2016 | Imai et al. | |
| 2017/0028917 | A1* | 2/2017 | Tauchi | G08G 1/165 |

FOREIGN PATENT DOCUMENTS

| | | |
|---|---|---|
| EP | 2410741 | 1/2012 |
| JP | 2007183877 | 7/2007 |
| JP | 2011016484 | 1/2011 |
| JP | 2011035816 | 2/2011 |
| JP | 2015081022 | 4/2015 |
| KR | 10-2015-0017095 | 2/2015 |
| WO | WO2015060354 | 4/2015 |

* cited by examiner

Parking space

DISPLAY APPARATUS AND VEHICLE INCLUDING THE SAME

CROSS-REFERENCE TO RELATED APPLICATIONS

The present application claims the benefit of an earlier filing date and right of priority under 35 U.S.C. 119 and 35 U.S.C. 365 to Korean Patent Application No. 10-2015-0117587 filed on Aug. 20, 2015, the content of which is hereby incorporated by reference in its entirety.

TECHNICAL FIELD

The present disclosure relates to a display apparatus in a vehicle.

BACKGROUND

A vehicle is an apparatus that moves a user in a direction in which he or she wants to go. A representative sample of the vehicle is a car.

For the convenience of a user who uses a vehicle, various sensors and electronic devices are typically included in the vehicle. In particular, various apparatuses for the driving convenience of a user are being developed.

With an increase in interest in self-driving vehicles, research on sensors for self-driving vehicles has been actively conducted. Sensors for self-driving vehicles include, as examples, a camera, an infrared sensor, a radar, a Global Positioning System (GPS), a Lidar, a gyroscope, etc. Among them, a camera may perform important functions as a sensor to detect objects or environmental conditions around a vehicle.

SUMMARY

Implementations provide a display apparatus that displays an eye area from an optimal view point according to a driving situation, and a vehicle including the same.

In one aspect, a display apparatus has an around-view monitor function and includes a camera configured to acquire an image by capturing an image of a view around a vehicle, a memory configured to store the captured image, and a processor. The processor is configured to, based on the captured image of the view around the vehicle, fix a view point for the around-view monitor function; designate a viewing area at the fixed view point for the around-view monitor function; and generate a fixed around-view monitor image representing the viewing area at the fixed view point. The display apparatus also includes a display unit configured to display the fixed around-view monitor image.

In some implementations, the display apparatus further includes a distance sensor configured to measure a distance between the vehicle and an object outside of the vehicle. The processor is further configured to determine the distance to the object based on the distance sensor, and detect a moving object based on the determined distance to the object.

In some implementations, the processor is further configured to, based on detecting the moving object, update a motion of the moving object on the fixed around-view monitor image.

In some implementations, the processor is further configured to determine a position change of the vehicle; and update an image of the vehicle on the fixed around-view monitor image according to the determined position change of the vehicle.

In some implementations, the processor is further configured to determine a likelihood of collision according to a driving direction of the vehicle and the motion of the moving object; and include, in the fixed around view monitor image and based on the determined likelihood of collision, an additional image that includes an indication of the moving object that is likely to collide with the vehicle.

In some implementations, the processor is further configured to match a currently captured image of the view around the vehicle, a stored previously captured image, and an image of the vehicle, and generate the fixed around-view monitor image based on matching the currently captured image of the view around the vehicle, the stored previously captured image, and the image of the vehicle.

In some implementations, the processor is further configured to determine that the vehicle is parking or changing lanes; automatically fix the view point based on the determination that the vehicle is parking or changing lanes; and generate the fixed around view monitor image based on the automatically fixed view point.

In some implementations, the processor is further configured to maintain the fixed view point and the designated viewing area while the vehicle moves.

In some implementations, the processor is further configured to detect a parking space in a vicinity of the vehicle; and fix the view point to a point located over the vehicle based on detecting the parking space.

In some implementations, the processor is further configured to determine sensor information comprising at least one of steering, acceleration pedal, or gear shift change; determine a prediction for a movement position of the vehicle according to the determined sensor information; determine, based on the prediction for the movement position of the vehicle, whether the vehicle is expected to park within the parking space; and include, in the fixed around-view monitor image, an additional image according to a determination that the vehicle is expected to park within the parking space.

In some implementations, the display apparatus further includes a distance sensor configured to measure a distance between the vehicle and an object within the designated viewing area. The processor is further configured to include, in the fixed around-view monitor image, an additional image representing the distance between the object within the viewing area and the vehicle.

In some implementations, the processor is further configured to determine that the image of the vehicle is not within the viewing area; and reset the fixed view point and the designated viewing area based on the determination that the image of the vehicle is not within the viewing area.

In some implementations, the processor is further configured to detect, from the fixed around-view monitor image, an input for selecting a parking space; and generate a signal for executing an automatic parking function of the vehicle in the parking space based on detecting the input for selecting the parking space.

In some implementations, the display apparatus further includes a communication unit configured to receive a top view image of the vehicle. The processor is further configured to generate the fixed around view monitor image based on the received top view image of the vehicle.

In some implementations, the processor is further configured to determine an image representing a door open area of the vehicle; and include, in the image of the vehicle, the image representing the door open area of the vehicle.

In some implementations, the processor is further configured to determine an image representing a relationship between the door open area of the vehicle and an object outside of the vehicle; and include, in the image of the vehicle, the image representing the relationship between the door open area of the vehicle and the object outside of the vehicle.

In some implementations, the processor is further configured to determine a driving lane of the vehicle; and move the fixed view point according to the determined driving lane of the vehicle.

In some implementations, the processor is further configured to fix the view point to the determined driving lane of the vehicle; and maintain the fixed view point and the designated viewing area while the vehicle changes from the driving lane to another lane.

In some implementations, the processor is further configured to determine a lane change of the vehicle while providing the around-view monitor image; and fix the view point to the driving lane of the vehicle based on sensing the lane change of the vehicle.

In some implementations, the processor is further configured to determine that the lane change of the vehicle has been completed; and update the around-view monitor image based on a determination that the lane change of the vehicle has been completed.

In some implementations, the display apparatus further includes a distance sensor configured to measure a distance between the vehicle and an object within the designated viewing area. The processor is further configured to determine a distance to another vehicle that drives in a destination lane; determine whether the distance to the other vehicle that drives in the destination lane is smaller than a threshold distance; and determine, from the fixed around-view monitor image and based on the determination of whether the distance to the other vehicle that drives in the destination lane is smaller than the threshold distance, a recommendation of whether to change lanes into the destination lane.

In some implementations, the processor is further configured to determine an image representing the recommendation of whether to change lanes into the destination lane; and include, in the fixed around-view monitor image, the image representing the recommendation of whether to change lanes into the destination lane.

In some implementations, the processor is configured to display the image of the vehicle such that the image of the vehicle is located off-center in the image of the viewing area.

In some implementations, the processor is configured to change a position of the image of the vehicle in the image of the viewing area according to movement of the vehicle.

In another aspect, a vehicle includes a display apparatus according to one or more of the above implementations.

All or part of the features described throughout this disclosure can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

A vehicle includes a driver assistance function that assists a user in driving and enhances driving safety and convenience.

For example, a display device in the vehicle may display an around-view image of a view around the vehicle, as well as an image of a fixed view in a particular direction. Such images may assist a driver of the vehicle to more easily recognize the position of the vehicle and surrounding situations.

However, such display devices may have limitations in that the images captured by a camera and shown on the display device may be limited to particular fixed viewing angles or viewing areas.

In the present disclosure, implementations are described that determine a driving situation of the vehicle, and determine an appropriate view point and an appropriate viewing area based on the driving situation. A display apparatus for a vehicle then displays those images of the surroundings of the vehicle. As such, implementations enable an adaptive vehicle-monitoring system that can automatically adapt to different driving situations of the vehicle. Such functionality may help improve the safety and driving convenience of drivers.

A vehicle discussed in the present disclosure may include a car or motorcycle, but implementations are not necessarily limited thereto, and may generally include any suitable vehicle that transports people. The following description is provided based on an example of a car.

The vehicle discussed in the present disclosure may include a power source. For example, the vehicle may be an internal combustion engine vehicle that includes an engine as a power source, a hybrid vehicle that includes an engine and an electrical motor as a power source, or an electrical vehicle that includes an electrical motor as a power source, or generally a vehicle that is motorized by any suitable power source.

In the following description, the left side of the vehicle refers to the left side of the driving direction of the vehicle and the right side of the vehicle refers to the right side of the driving direction of the vehicle.

A left-hand drive (LHD) vehicle refers to a vehicle in which a driver's seat is located at the left side of the vehicle. A right-hand drive (RHD) vehicle refers to a vehicle in which a driver's seat is located at the right side of the vehicle.

In the following description, a left-hand drive (LHD) vehicle is described unless mentioned to the contrary.

Figure 1:
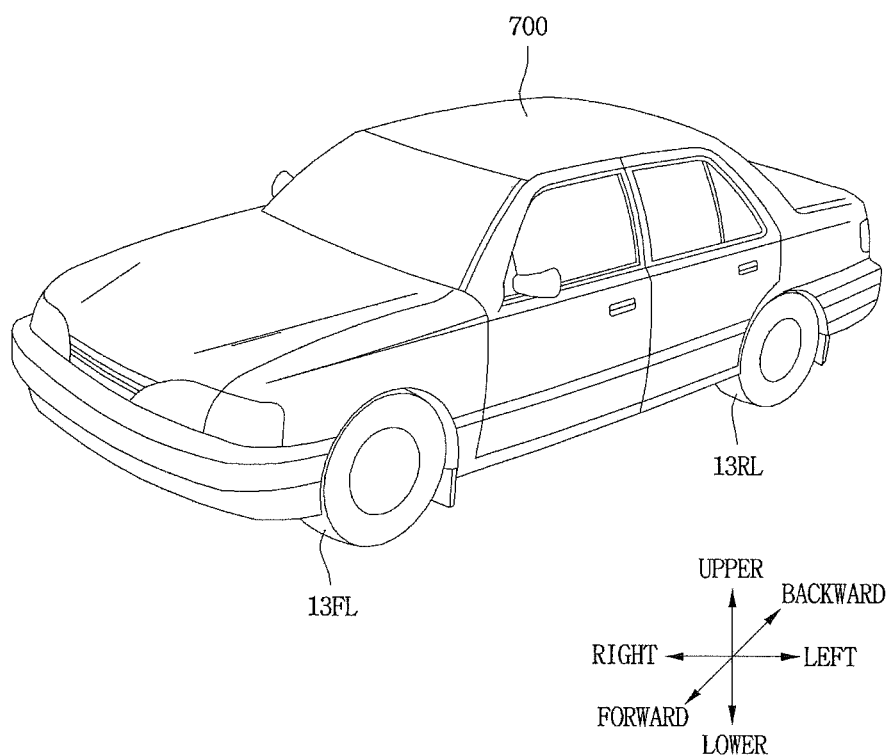
FIG. 1 is a diagram illustrating an example of an exterior of a vehicle that includes a display apparatus.
Figure 2:
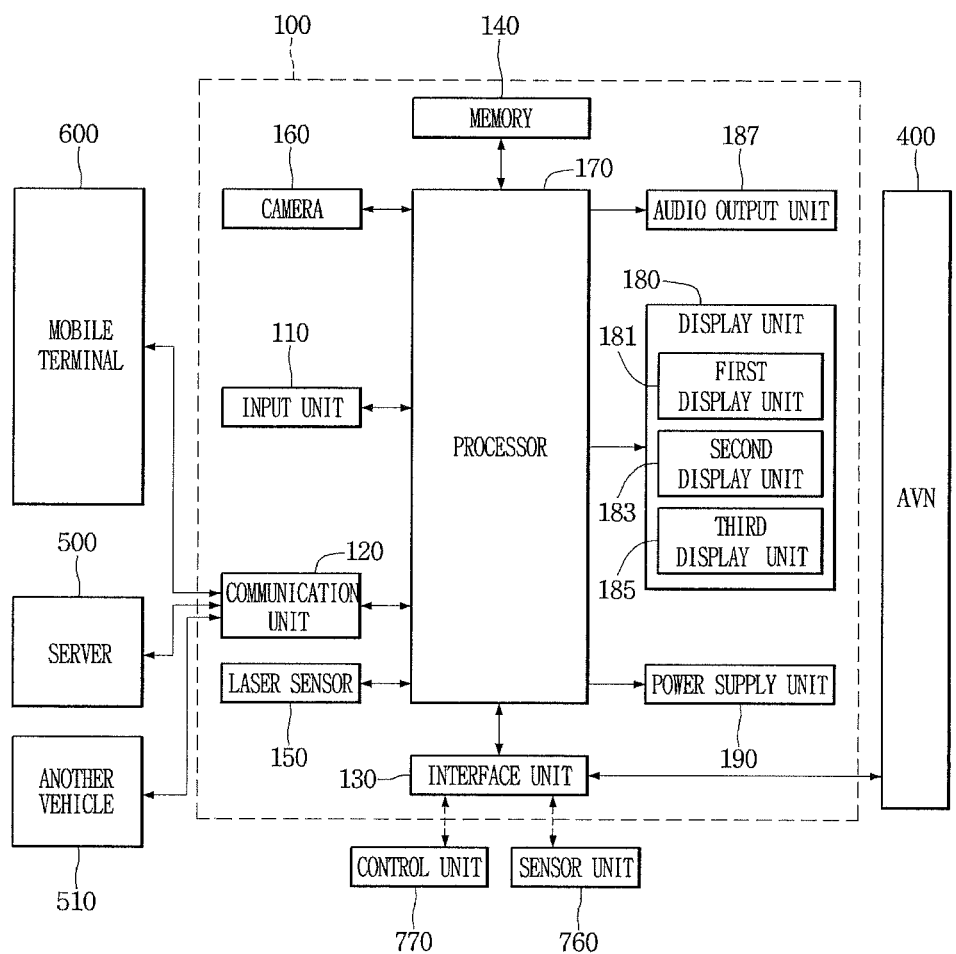
FIG. 2 is a block diagram illustrating an example of a display apparatus.

FIG. 1 is a diagram showing the exterior of a vehicle that includes a display apparatus according to an implementation, and FIG. 2 represents a block diagram of a display apparatus according to an implementation.

Referring to FIGS. 1 and 2, a vehicle 700 may include wheels 13FL and 13FR that rotate by a power source, driving manipulation units (e.g., driving manipulation units 721A to 721C in FIG. 10) for controlling the driving of the vehicle 700, and a display apparatus (e.g., display apparatus 100 in FIG. 2).

In an implementation, it is described that the display apparatus 100 is a separate apparatus in the vehicle 700 and displays a driver assisting image by sending and receiving information through data communication with the vehicle 700. In this case, some of the units of the display apparatus 100 are not included in the display apparatus 100 but may be units of the vehicle 700 or another apparatus in the vehicle 700. By transmitting and receiving data through an interface unit 130 of the display apparatus 100, these units may be understood to be included in the display apparatus 100.

In another implementation, some of the units of the vehicle 700 may also be referred to as the display apparatus 100.

Although the display apparatus 100 according to an implementation is described to include units shown in FIG. 2, it is also possible to use units in the vehicle 700 through the interface unit 130 and the display apparatus 100 may be implemented by a combination of units in the vehicle 700.

Such a display apparatus 100 may include an input unit 110, a communication unit 120, an interface unit 130, a memory 140, a laser sensor 150, a camera 160, a processor 170, a display unit 180, an audio output unit 187, and a power supply unit 190.

Firstly, the display apparatus 100 may include a camera 160 that captures images of views around a vehicle. The images of views around the vehicle that are captured through the camera 160 may be utilized for an around-view monitor image generation.

In some implementations, such a camera 160 may include a plurality of cameras.

Figure 3:
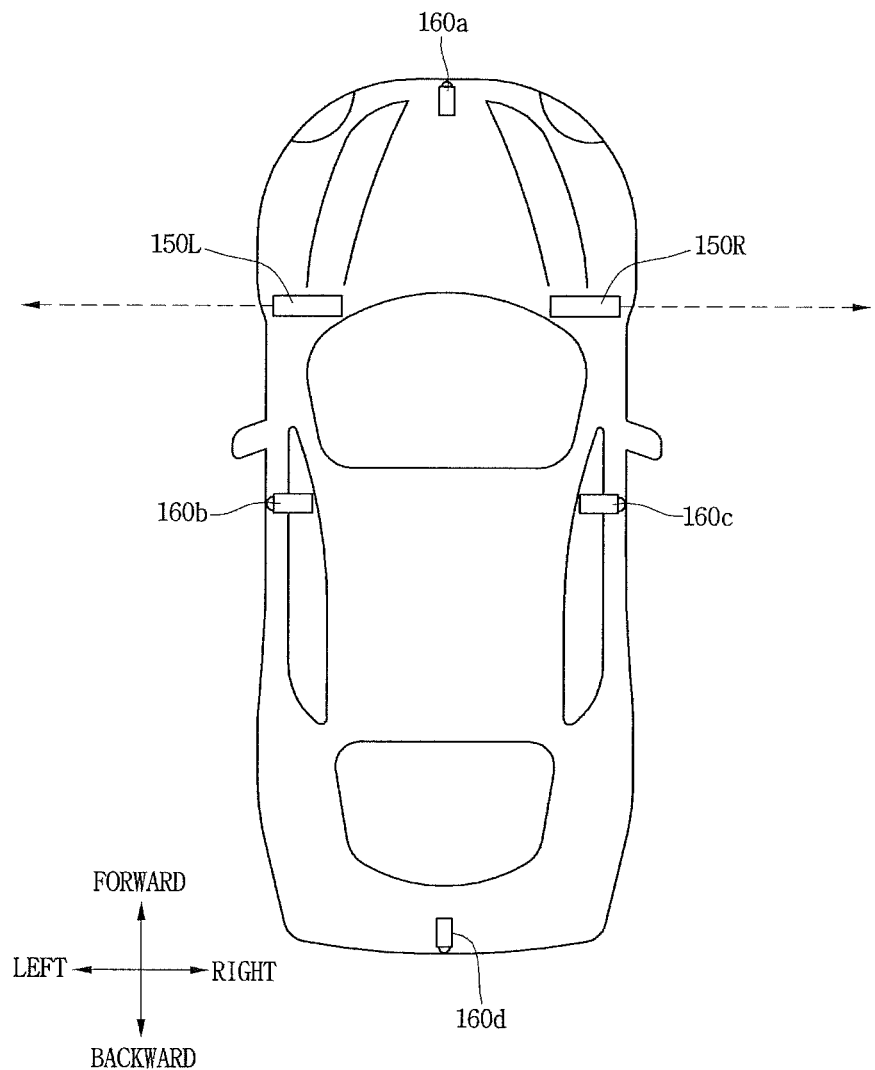
FIG. 3 is a diagram illustrating an example of a plan view of a vehicle that includes a display apparatus.

FIG. 3 is a diagram showing the plan view of the vehicle 700 that includes the display apparatus 100 according to an implementation.

Referring to FIG. 3, a plurality of cameras 160a to 160d may be disposed on at least one of the left, rear, right, or front of the vehicle 700.

For example, the left camera 160b may be disposed in a casing that surrounds a left side mirror. Alternatively, the left camera 160b may be disposed outside the casing that surrounds the left side mirror. Alternatively, the left camera 160b may be disposed on a region outside a left front door, a left rear door, or left fender of the vehicle 700.

As another example, the right camera 160c may be disposed in a casing that surrounds a right side mirror. Alternatively, the right camera 160c may be disposed outside the casing that surrounds the right side mirror. Alternatively, the right camera 160c may be disposed on a region outside a right front door, a right rear door, or right fender of the vehicle 700.

In some implementations, the rear camera 160d may be disposed near a rear number plate or trunk switch. The front camera 160a may be disposed near an emblem or radiator grill. Alternatively, the rear camera 160d and the front camera 160a may also be disposed inside the vehicle 700.

Such a camera 160 may include an image sensor and an image processing module. The camera 160 may process a still image or video that is obtained by an image sensor (e.g., CMOS or CCD). The image processing module may process the still image or video obtained by the image sensor to extract information, and deliver the extracted information to the processor 170.

As such, images captured from at least one of all directions around the vehicle 700 may be processed by the processor 170 to be capable of being provided as an around-view monitor image that enables a user to intuitively recognize situations around the vehicle.

For example, the processor 170 may synthesize images captured from several or all directions to provide an around-view monitor image from a top view of the vehicle 700.

Figure 4:
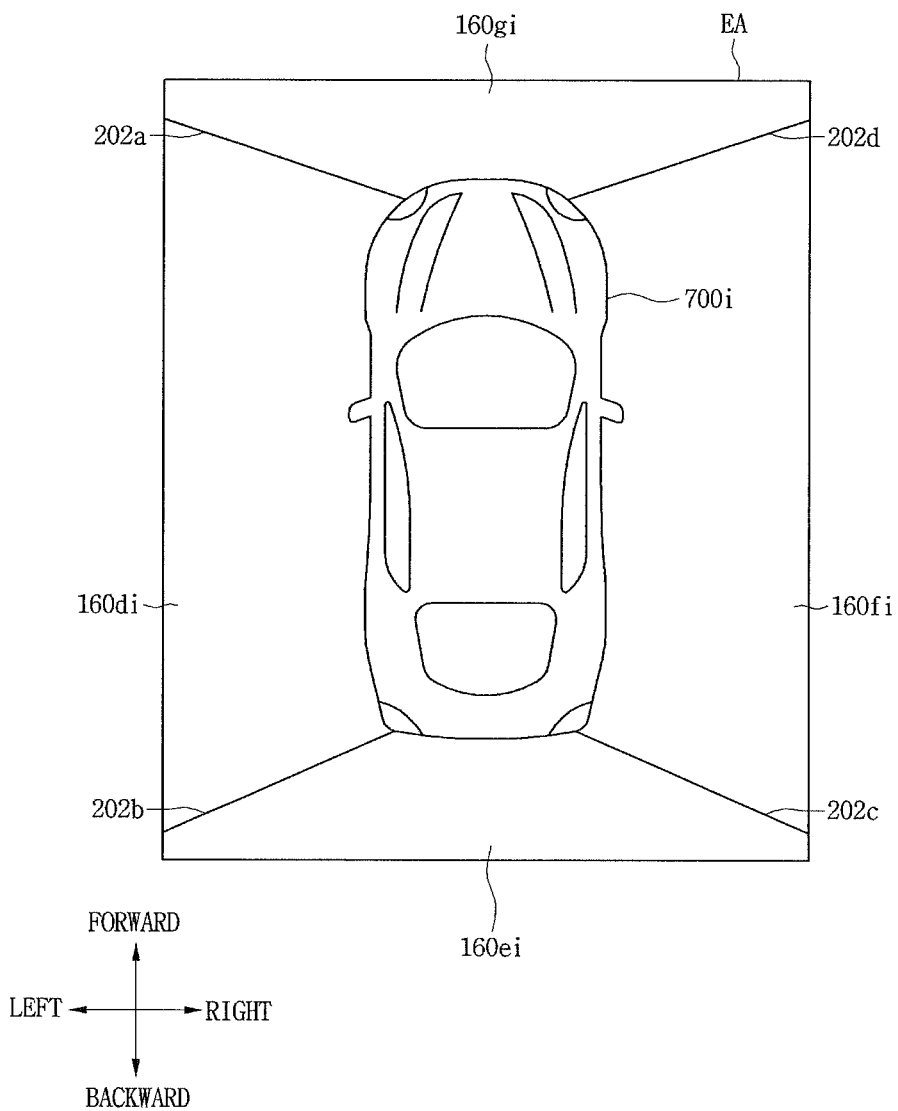
FIG. 4 is a diagram illustrating an example of a camera that provides an around view monitor function.

FIG. 4 is a diagram of an example of the camera 160 providing an around-view monitor function according to an implementation.

Specifically, referring to the example in FIG. 4, the around-view monitor image may include a first image region 160di captured by the left camera 160, a second image region 160ei captured by the rear camera 160d, a third image region 160fi captured by the right camera 160c, and a fourth image region 160gi captured by the front camera 160a.

When generating the around-view image including such a plurality of image regions, there may be boundaries (e.g., boundary lines 202a to 202d) between image regions. These boundaries may be naturally displayed by image blending. In this case, boundary lines 202a to 202d may also be displayed at the boundaries between the plurality of images.

A vehicle image 700i may be included in the around-view monitor image. In this example, the vehicle image 700i may be a virtual image generated by the processor 170, but implementations are not limited thereto. If an image captured directly from the top of the vehicle 700 is utilized, then a separate vehicle image 700i may not necessarily be generated.

The display apparatus 100 may display such an around-view monitor image through the display unit 180. For example, by displaying the around view monitor image representing the top view of the vehicle 700 when parking, such around-view functionality may assist a driver in more easily parking the vehicle 700. As another example, by displaying the around-view monitor image representing a situation of a left lane or a right lane of the vehicle 700 when changing lanes on a road, the around-view functionality may assist a driver in changing lanes.

Furthermore, in some implementations, the display apparatus 100 may provide a fixed around-view monitor image. In this example, the fixed around-view monitor image may be defined as an image representing viewing area when a particular view point is fixed and a particular eye area, or viewing area, from the fixed view point is designated. Such a fixed around-view monitor image may provide an image from a desired (e.g., an optimal) view point and desired (e.g., optimal) viewing area to a driver. For example, the designated view point and viewing area may be determined based on a driving situation, and may thus assist the driver in driving during the driving situation.

In some implementations, the display apparatus 100 may further include a laser sensor 150 that may measure a distance between the vehicle 700 and an object around the vehicle. In addition, the measured distance to the object may be utilized for around-view monitor image generation. Also, the distance information may be used for blind spot detection (BSD) that monitors one or more blind spots of the driver.

Although the laser sensor 150 is used for distance measurement in an implementation, other types of sensors may be used as an alternative or in addition to the laser sensor 150. Such sensors may include, for example, an ultrasonic sensor, a stereo sensor (e.g., camera 160), etc.

In some implementations, a laser sensor 150 may irradiate a laser beam to the object, detect a reflected laser to measure the distance between the vehicle 700 and the object, and thus detect the position of the object around the vehicle.

In addition, the position of the object measured in this way may be utilized for around-view monitor image generation. For example, after the detection of the position of the vehicle 700 by using the position of the object measured, the system may determine the position of the vehicle image 700i from the around-view monitor image. In some implementations, the system may also detect, among objects around the vehicle 700, one or more objects that pose a threat to driving, and the system may highlight the detected threatening object(s) to generate an additional image.

In some implementations, the system may compare a previously-captured image with a real-time captured image to generate an around view monitor image. Such functionality may be utilized for analyzing a relationship between the previously-captured image with the real-time captured image.

In some implementations, a laser sensor 150 may be disposed on at least one side of the vehicle 700 to measure a distance between a side of the vehicle 700 and an object.

Referring to FIG. 3, a left laser sensor 150L may be disposed on the left of the vehicle 700 and irradiate a laser beam to the left of the vehicle 700 to measure a distance between the side of the vehicle 700 and a left object. Also, a right laser sensor 150R may be disposed on the right of the vehicle 700 and irradiate a laser beam to the right of the vehicle 700 to measure a distance between the side of the vehicle 700 and a right object.

Figure 5:
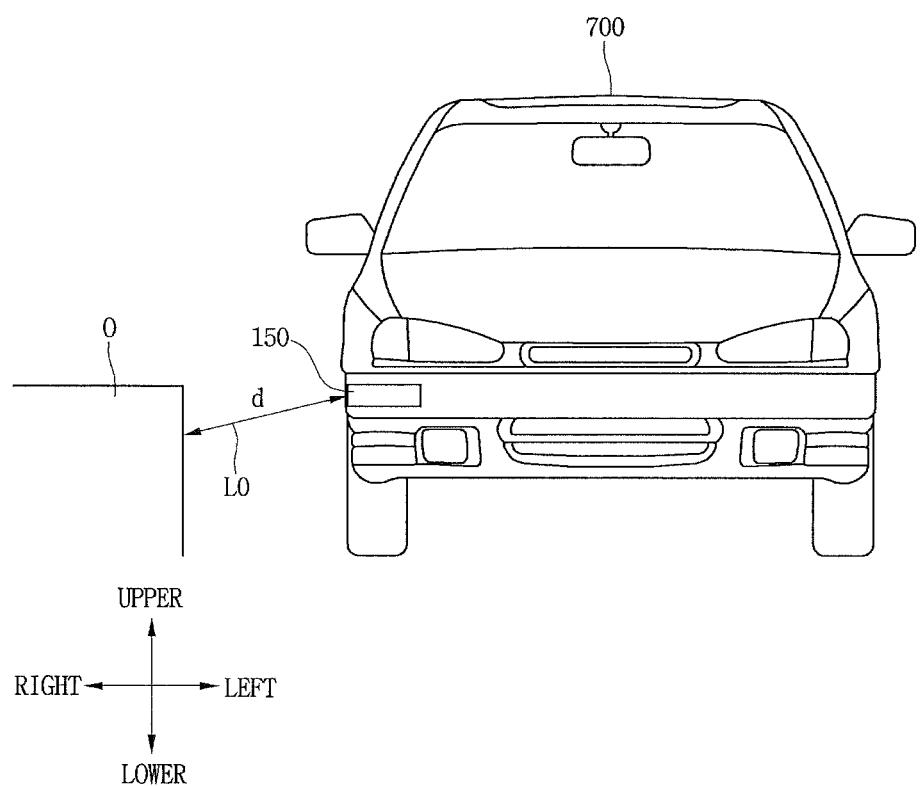
FIG. 5 is a diagram illustrating an example of measuring a distance to an object through a laser sensor.

As a specific example, referring to FIG. 5, a laser sensor 150 may be disposed on the side of the vehicle 700, irradiate a laser beam to the outside of a corresponding side, and receive a reflected signal from the irradiated laser beam that is reflected from the object O. In addition, by analyzing output laser signal information and the reflected signal information, the system may determine a distance d between the side of the vehicle 700 and the object O.

For example, the system may measure the distance d between the vehicle 700 and the object O by using one or more techniques such as time-of-flight (TOF) and/or phase shift according to a laser signal modulation method.

As a specific example, the system may measure the distance d to the object O by emitting a pulse laser signal according to a time delay method and by measuring a time when reflected pulse signals from the object O that are within a measurement range reach a receiver.

Alternatively, the system may determine a time and the distance d by emitting a laser beam continuously modulated with a specific frequency according to a phase shift method and measuring the phase shift of a signal reflected from the object O within a measurement range.

Such a laser sensor 150 may have an advantage in that it may be used to measure distances with a desired accuracy. For example, the laser sensor 150 may be implemented by using a small-size, low-power, low-cost semiconductor laser diode that has a high range resolution. For example, such a laser sensor 150 may accurately recognize a distance between the vehicle 700 and a space where the vehicle 700 is not disposed based on a difference between the reflection of a laser beam and the non-reflection of the laser beam, it is possible to precisely observe the position of the object.

In some implementations, the operating range of a laser beam irradiated by the laser sensor 150 may be long-range. For example, the operating range may be between 30 meters and 300 meter. In such cases, the laser sensor 150 having the long range capability may detect an object that is outside the capturing region of a camera. Thus, the processor 170 may detect an object outside the range of a real-time captured image of a camera, and may utilize the detected object for updating an image outside a real-time captured region on a fixed around view monitor image.

In another implementation, the system may generate an around-view monitor image by using the laser sensor 150 and at least one camera 160. For example, the system may generate and display an around-view monitor image without adding four dedicated cameras 160, by utilizing left and right laser sensors 150 in the other implementation.

FIGS. 6 to 9 are diagrams of examples of providing an around-view monitor function according to another implementation. In these examples, a vehicle may generate an around-view monitor function using a fewer number of cameras by jointly utilizing one or more laser sensors.

Figure 6:
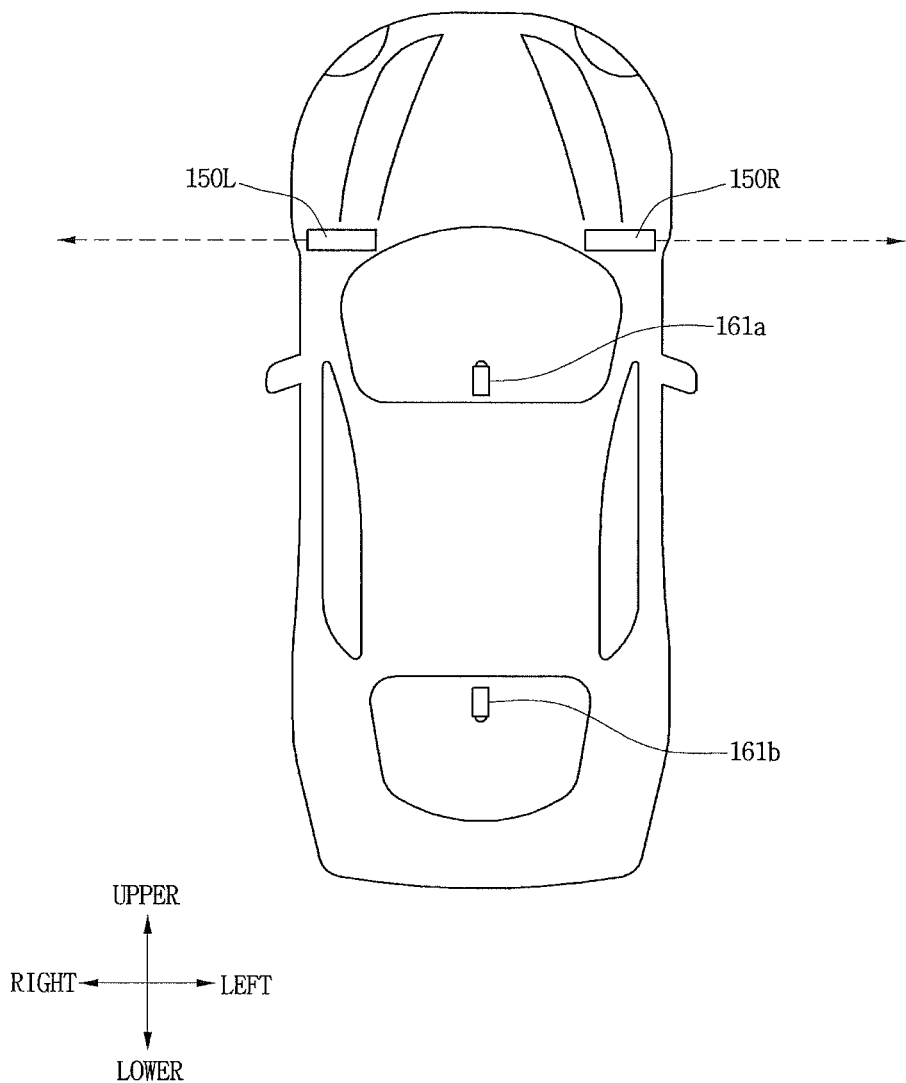
FIGS. 6 to 9 are diagrams illustrating examples of providing an around view monitor function.

Specifically, referring to the example in FIG. 6, a camera 160 may include a rear camera 161b that is disposed in the vehicle 700 to capture an image behind the vehicle 700, and laser sensors 150L and 150R may be disposed on the left and right of the vehicle 700.

In the following, the process of generating an around-view monitor image by using a rear image (e.g., rear image 161ei in FIG. 7) of the vehicle 700 captured by the rear camera 161b and the laser sensors 150L and 150R disposed on the left and right is described. Although in this case, the around-view monitor image is described in an example situation of parking of the vehicle 700, the around-view monitor image may generally be used in other driving situations.

Figure 7:
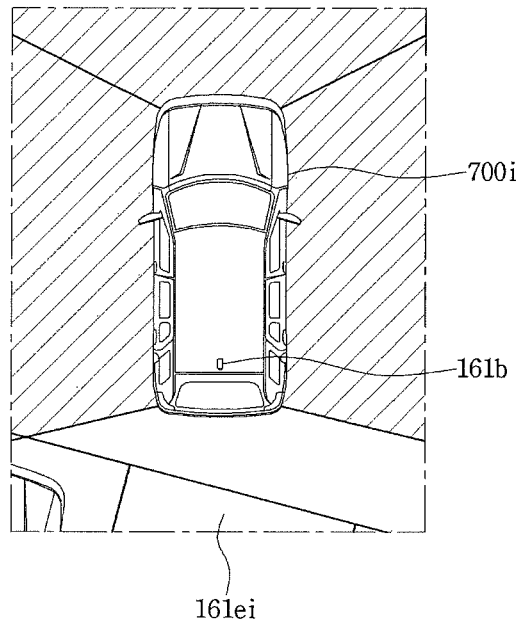

Referring to the example in FIG. 7, when the around-view monitor image is generated for assisting driving, the rear image 161ei of the vehicle 700 may be displayed on the around-view monitor image. For example, if there is no camera that captures images of the left and right sides of the vehicle 700, then only the rear image 161ei may be displayed on the around-view monitor image.

For example, when a driver selects a rear shift gear for parking, the real-time rear image 161ei of the rear camera 161b and a vehicle image 700i may be included and displayed in the around-view monitor image as shown in FIG. 7.

In some implementations, the rear image 161ei may be displayed on a display unit (e.g., display unit 180 in FIG. 2) and may be stored in a memory (e.g., memory 140 in FIG. 2).

The laser sensor 150 may measure distances to objects on the left and right. A processor 170 may detect the position of the object, generate a virtual edge line representing the edge of the object, and include the generated edge line in the around-view monitor image.

Thus, a driver may check a region of interest behind the vehicle 700 (e.g., related to parking) through the rear image 161ei, and may also check threatening objects on the left and right of the vehicle 700 through the virtual edge line.

In another implementation, the display apparatus 100 may widen the viewing region of the around-view monitor image by using an image captured by a front camera 161a as an additional input for performance enhancement.

Figure 8:
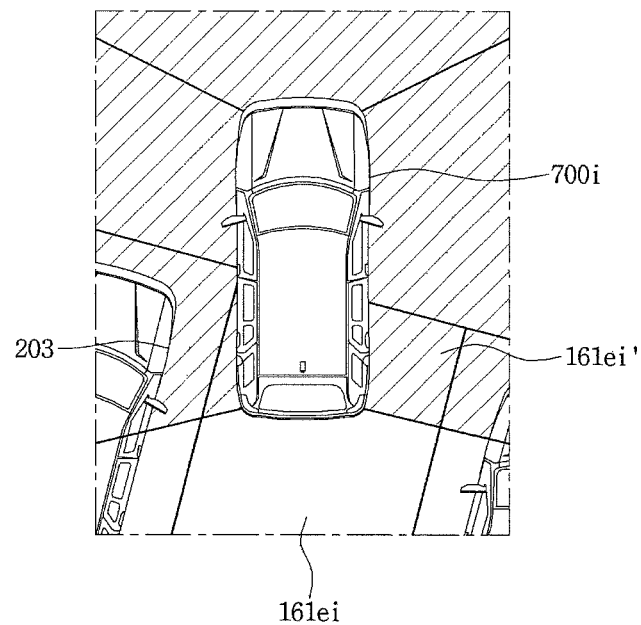

Referring to FIG. 8, a rear camera (e.g., the rear camera 161b in FIG. 7) may gradually capture an image of a rear region as the vehicle 700 moves backward.

The processor 170 may generate an around-view point image by using an image captured in real time, the previous image stored in the memory 140, and an object edge detected through the laser sensor 150.

For example, the processor 170 may display the rear region as an image captured in real time and the left and right regions as the previous image 161ei' on the around-view point image. In this case, the processor 170 may match the previous image 161ei' and the real-time rear image 161ei by using the object edge detected through the laser sensor 150 to further enhance the accuracy of image match.

Also, the processor 170 may generate a virtual edge line 203 representing the edge of an object for the left and right regions having no previous images, and include the generated edge line in an around-view monitor image.

Through such an around-view monitor image generation process, the display apparatus 100 according to the other implementation may generate and display the around-view monitor image as the least image module.

The display apparatus 100 may more accurately find the position of the vehicle 700 by using the laser sensor 150 and images from the camera 160.

The display apparatus 100 may acquire images around the vehicle through the camera 160 during driving and detect an object captured from the images around the vehicle by using the laser sensor 150.

Figure 9:
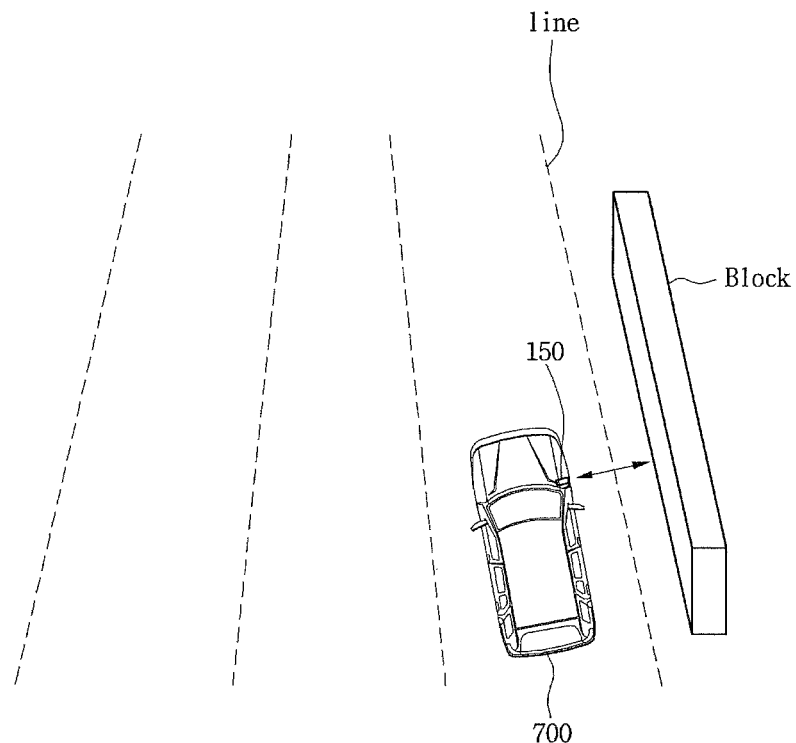

For example, referring to FIG. 9, the display apparatus 100 may capture images of a guard block and lane, and measure the distance between the guard block and the lane by using the laser sensor 150.

After detecting how far the vehicle 700 is from the guard block, the processor 170 may determine the position of the vehicle 700 on the image based on the guard block, and accurately determine in what lane the vehicle 700 is driving.

Also, the processor 170 may detect the movement of the position of the object at the laser sensor 150 and thus determine more accurately what lane the vehicle 700 is driving. For example, when an object moving in the reverse direction is detected, it is possible to more accurately determine the position of the vehicle 700 through the distance between an opposite lane and the vehicle 700 by detecting the lane on which the object is driving as the opposite lane.

For example, by enhancing the accuracy of lane recognition by using the laser sensor 150 and image information, the display apparatus 100 may accurately recognize what lane the vehicle 700 is driving.

Thus, the display apparatus 100 has an advantage in that it is possible to navigate the driving of the vehicle 700 for each lane.

Referring back to FIG. 2, the display apparatus 100 may include an input unit 110 that senses the input of a driver. The driver may control an around view monitor function through the input unit or perform an input for executing the power on and off of the display apparatus 100.

Specifically, the driver may execute the around view monitor function through the input unit 110 to display an around view monitor image, and perform a manual input for fixing a view point or designating an eye area.

Such an input unit 110 may include at least one of a gesture input unit that senses a driver gesture, a touch input unit that senses a touch, or a microphone that senses a voice input, and thus sense a driver user.

Next, the display apparatus 100 may include a communication unit 120 that performs communication with another vehicle 510, a terminal 600, a server 500, etc. The display apparatus 100 may receive navigation information and/or traffic information through the communication unit 120. In addition, the received information may be used for around view monitor image generation.

Specifically, the communication unit 120 may exchange data with the mobile terminal 600 or the server 500 wirelessly. In particular, the communication unit 120 may wirelessly exchange data with the mobile terminal of the vehicle 700 driver. The wireless data communication scheme may include various data communication schemes, such as Bluetooth, WiFi, Direct WiFi, APiX, or NFC schemes.

The communication unit 120 may receive position information, weather information, or road traffic information, e.g., transport protocol expert group (TPEG) information, from the mobile terminal 600 or the server 500.

Also, the communication unit 120 may also receive navigation information from the mobile terminal 600, when the mobile terminal 600 is used as a navigation device. In this example, the navigation information may include at least one of map information relating to vehicle 700 driving, position information on the vehicle 700, preset destination information, and route information depending on a destination.

Also, when a driver gets in the vehicle 700, the mobile terminal 600 of the driver and the display apparatus 100 may also perform pairing automatically or by the execution of an application by the driver.

The communication unit may transmit an around view point image to the mobile terminal 600 through pairing to provide the image to the driver.

Next, the display apparatus 100 may include an interface that receives vehicle 700 concerning data or transmits a signal processed or generated by the processor 170 to the outside.

Specifically, the display apparatus 100 may receive navigation information and/or sensor information through the interface unit 130. In addition, the received information may be used for around view monitor image generation.

To this end, the interface unit 130 may perform data communication with the control unit 770, an audio video navigation (AVN) apparatus 400, the sensor unit 760, and so on through wired or wireless communication.

The interface unit 130 may receive navigation information by data communication with the control unit 770, the AVN apparatus 400 and or a separate navigation apparatus.

Also, the interface unit 130 may receive sensor information from the control unit 770 or the sensor unit 760.

In this example, the sensor information may include at least one of direction information on the vehicle 700, position information, speed information, acceleration information, tilt information, forward/backward movement information, fuel information, information on the distances to front and rear vehicles, information on the distance between the vehicle 700 and a lane, and turn signal information.

Also, the sensor information may be acquired from a heading sensor, a yaw sensor, a gyro sensor, a position module, a vehicle forward/backward movement sensor, a wheel sensor, a vehicle speed sensor, a vehicle tilt sensor, a battery sensor, a fuel sensor, a tire sensor, a steering sensor by steering wheel rotation, a vehicle temperature sensor, and a vehicle humidity sensor. The position module may include a GPS module for the reception of GPS information.

The processor 170 may use such navigation information and sensor information to accurately detect the position of the vehicle 700, and determine the position of the vehicle image 700i on the around view monitor image by using the detected position.

The interface unit 130 may receive a driver input that is received through the user input unit 110 of the vehicle 700. The interface unit 130 may receive the driver input from the input unit 720 of the vehicle 700 or through the control unit 770. For example, when the input unit 110 is disposed as a component in the vehicle 700, it is possible to receive the driver input through the interface unit 130.

The interface unit 130 may also receive traffic information acquired from the server 500. The server 500 may be a server that is located at a traffic control center controlling traffic. For example, when the traffic information is received from the server through the communication unit 120, the interface unit 130 may also receive the traffic information from the control unit 770.

Next, the memory 140 may store various pieces of data for the overall operations of the display apparatus 100, such as programs for processing or control by the processor 170.

Specifically, the memory 140 may store real-time images captured by the camera 160 as the previous images. Then, when a region to be captured varies according to the movement of the vehicle 700, it is possible to generate the around view monitor image by utilizing the previous images.

Also, the memory 140 may store data for object verification. For example, the memory 140 may store data for checking through a certain algorithm what an object is when a certain object is detected from an image acquired through the camera 160.

For example, the memory 140 may store data on traffic information as data for object verification. For example, when certain traffic information, such as a lane or traffic sign is detected from the image acquired through the camera 160, the memory 140 may store data for checking through a certain algorithm what the traffic information is. Also, the memory 140 may be various storage devices, such as ROMs, RAMs, EPROMs, flash drives, hard drives, etc. that are hardware.

Next, the display apparatus 100 may further include a monitor unit (not shown) that captures an internal image of the vehicle 700.

Specifically, the monitor unit may sense and acquire driver's biometric information. In addition, the acquired biometric information may be included in a driver assistance function operation history. For example, when an autonomous emergency braking function operates, the control state of the driving control unit by the driver or the excited state of the driver are stored and it is possible to supplement the value of driver assistance function operation history information later.

The biometric information may include image information including an image of the driver, fingerprint information, iris-scan information, retina-scan information, hand geometry information, facial recognition information, and voice recognition information. For example, the monitor unit may include a sensor that sense driver's biometric information.

Also, the monitor unit may acquire an image for driver's biometrics. For example, the monitor unit may be an image acquisition module that is disposed in the vehicle 700.

Also, it is possible to analyze an image of the driver acquired through the monitor unit and detect driver's line of sight. In addition, the processor 170 may control a display unit 180 so that projected images are displayed on the wind shield W according to the detected line of sight.

In addition, the display apparatus 100 may include the display unit 180 that displays an around view monitor image.

Such a display unit 180 may include a plurality of displays.

Specifically, the display unit 180 may include a first display unit 181 that projects and displays an image onto the windshield of the vehicle 700. For example, the first display unit 181 may include a projection module projecting an image onto the windshield W, as a head up display (HUD). In addition, since a projected image projected by the projection module has predetermined transparency, a driver may simultaneously see the projected image and a view after the projected image.

The projected image displayed on such a first display unit 181 may overlap a reflected image reflected to the window shield W to implement augmented reality (AR).

Figure 12:
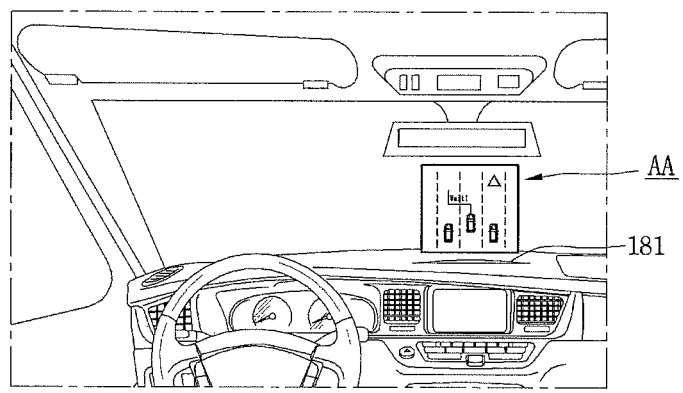
FIG. 12 is a diagram illustrating an example of a first display unit.

Specifically, referring to FIG. 12, the first display 181 may display an around view point image on a wind shield. In this case, the first display unit 181 may further display additional images, such as highlight of threatening objects detected by a sensor, a distance to a lane, and a distance to an adjacent vehicle.

The display unit 180 may include a second display unit 183 that is separately installed in the vehicle 700 and displays the around view monitor image.

Figure 10:
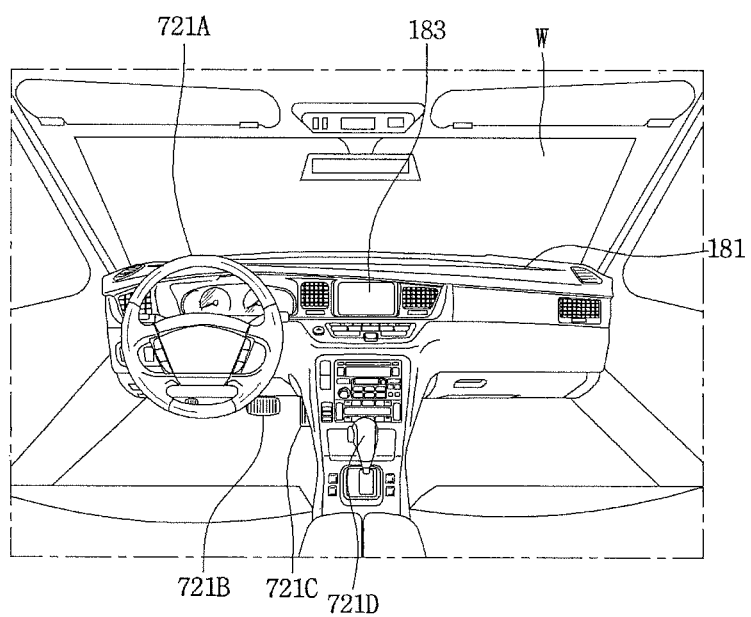
FIG. 10 is a diagram illustrating an example of an interior of a vehicle that includes a display apparatus.

Specifically, referring to FIG. 10, the second display unit 183 may be the display of a vehicle 700 navigation apparatus or the front cluster inside the vehicle 700.

Also, the second display unit 183 may include at least one of a liquid crystal display (LCD), a thin film transistor LCD (TFT LCD), an organic light-emitting diode (OLED), a flexible display, a 3D display, and an e-ink display.

Such a second display unit 183 may be coupled to the gesture input unit 110 to form a touch screen.

A driver may control an around view monitor function through the touch screen and check an image according to the control.

Also, the display unit 180 may include a third display unit 185 that is coupled to a vehicle 700 mirror and displays an image installed in the vehicle 700 and displays an image through the penetration of the mirror.

Figure 11:
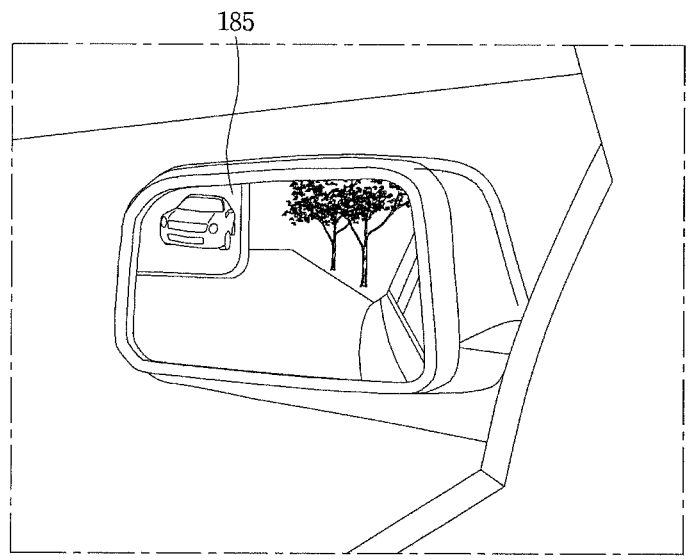
FIG. 11 is a diagram illustrating an example of a third display unit.

Specifically, referring to FIG. 11, the third display unit 185 may display an around view monitor image on a portion of a side mirror. Also, the third display unit 185 may also display an image indicating blind spot detection.

The third display unit 185 may provide the entire situation around the vehicle as an around view monitor image on the side mirror when there is a need to change a lane, so it is possible to assist a driver in changing a lane.

Moreover, the display apparatus 100 may further include the audio output unit 187 and a power supply unit 190.

Specifically, the audio output unit 187 may output a description on the around view monitor function, or a message checking whether to execute the function through audio directions. The display apparatus 100 may supplement a description on the around view monitor function through the audio direction of the audio output unit 187, in addition to a visual display through the display unit 180.

Lastly, the display apparatus 100 may include the processor 170 that controls the overall operations of each unit in the display apparatus 100. The processor 170 may generate an around view monitor image through information acquired from at least one of the camera 160, the laser sensor 150, the communication unit 120, and the interface. Also, the processor 170 may update the generated around view monitor image according to the movement of the vehicle 700 or object detection. Also, the processor 170 may display such an around view monitor image through the display unit 180.

In particular, the processor 170 may fix a view point according to the driving situation of the vehicle 700 and designate an eye area from the view point, then generate a fixed around view monitor image representing the eye area and display the generated image on the display unit 180.

In the following, for the convenience of description, upper and lower directions are defined as the vertical direction, and a plane including forward, backward, left and right directions is defined as the horizontal plane.

Figure 13:
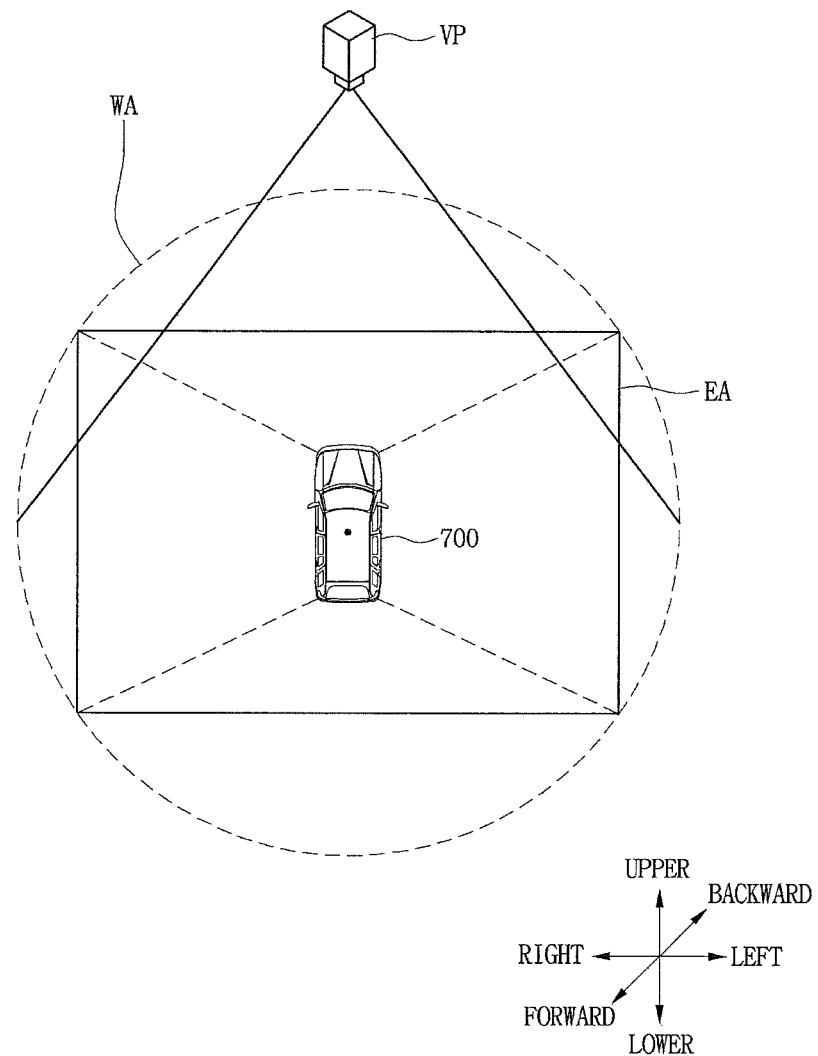
FIGS. 13 and 14 are diagrams illustrating examples of a fixed around view monitor function.
Figure 14:
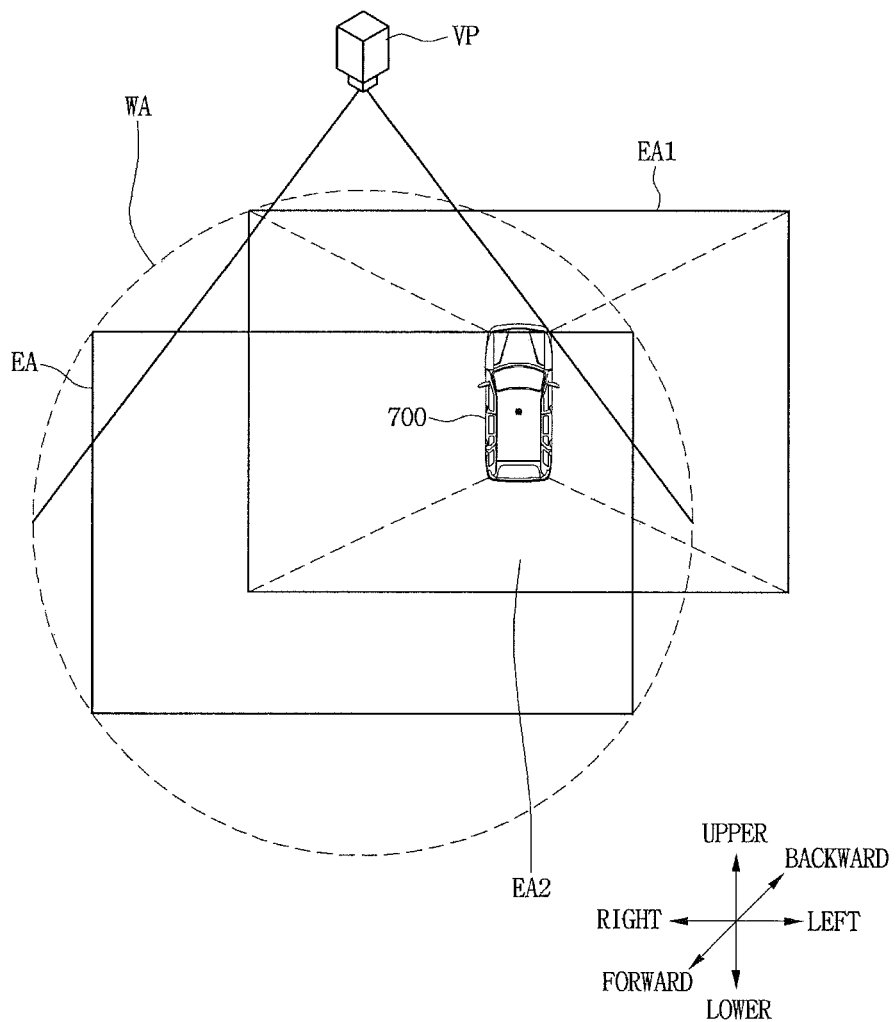

FIGS. 13 and 14 are conceptual diagrams for explaining a fixed around view monitor function according to an implementation.

Specifically, referring to FIG. 13, when viewing the vehicle 700 from the vertical (upper) direction of the vehicle 700, it is possible to observe the vehicle 700 and the situation around the vehicle as a plane image. In this case, a region that may be seen from a view point VP is defined as a watching area WA and a region to be displayed in the watching area WA is defined as an eye area EA.

Thus, the watching area WA widens according to the height of the view point VP, the watching area may be formed within a certain radius from the vehicle 700, and the eye area EA may be determined according to the (heading) direction in which the vehicle 700 looks at.

The processor 170 may match images captured from all directions of the vehicle 700 and dispose the vehicle image 700*i* at the center of the images to generate an around view monitor image when looking at the vehicle 700 from the view point VP over the vehicle 700. In case that the around view monitor image is generated in this way, the horizontal position of the view point VP may depend on the position of the vehicle 700 and the eye area EA may depend on the heading direction of the vehicle 700.

For example, if the vehicle 700 moves forward, the view point VP also moves to the front and so the eye area EA that the around view monitor image represents would also move to the front. Thus, the around view monitor image may accurately represent the situation around the vehicle.

However, since the vehicle image 700*i* is disposed at the center of the around view monitor image all the time, it is difficult for a driver to understand the motion of the vehicle 700 by driving control through the around view monitor image.

For example, if the driver moves forward, controlling the control of a steering angle, it is difficult to find through the around view monitor image at which speed and in which heading direction the vehicle 700 moves.

The reason is why the view point VP varies over the vehicle 700 according to the movement of the vehicle 700.

Thus, the processor 170 may fix the view point VP depending on the situation and provide a fixed around view monitor image representing an eye area EA from the fixed view point VP.

Referring to FIG. 14, in case that the position of the view point VP of FIG. 13 is fixed and the vehicle 700 moves, the driver may be aware of the position variation of the vehicle 700 within the eye area EA if the view point VP and the eye area EA are fixed even when the position of the vehicle 700 varies.

Specifically, the processor 170 may maintain the view point VP and the eye area EA even when the vehicle 700 moves after the view point VP and the eye area EA are fixed. Thus, the vehicle image 700*i* may not be at the center of the eye area EA.

Thus, the driver may be aware of the motion of the vehicle 700 according to the control of a driving control unit through a fixed around view point VP image. For example, the driver may intuitively understand the motion of the vehicle 700 according to control, through an image from a fixed top view point VP.

The processor 170 may match a real-time captured image, a stored, previously captured image, and an image of the vehicle 700 to generate a fixed around view monitor image that represents the eye area EA.

Specifically, referring to FIG. 14, when the eye area EA from the fixed view point VP is defined as a first eye area EA, the view point VP of a real-time captured image according to the movement of the vehicle 700 also moves and so the image captured in real time represents a second eye area EA1. However, if an area to be captured by the camera 160 is wide and so may include the first eye area EA, it is possible to express the first eye area EA1 by the image captured in real time.

In the following, the process of generating a fixed around view monitor image when the width of an area to be captured by the camera 160 is the same as that of the eye area EA is described.

The processor 170 may match a real-time captured image, a stored, previously captured image, and an image of the vehicle 700 to generate the fixed around view monitor image.

In case that the view point VP and the eye area EA are fixed before the vehicle 700 moves, an image captured in the fixed situation represents the first eye area EA, but in case the vehicle 700 moves, it is difficult to represent the first eye area EA because the second eye area EA1 moves.

Thus, the processor 170 may use the previous image representing the first eye area EA to generate the fixed around view monitor image.

For example, the processor 170 may display a real-time captured image on which an area at which the second eye area EA1 and the first eye area EA overlap represents the second eye area EA1, and the previous image on which another area (hereinafter, referred to as a "third eye area EA2") represents the first eye area EA.

The processor 170 may accurately measure the range of the second eye area EA1 of an image captured according to the position variation of the vehicle 700 and match the first eye area EA and the second eye area EA1 accordingly to generate the fixed around view monitor image. In this case, a distance to an object measured by a laser sensor 150 may be used as correction data for image match.

It is difficult to find the third eye area EA2 from a real-time captured image, and thus when a threatening object approaches the third eye area EA2, a driver may not find it and thus there is a possibility of accident.

In order to prevent it, the processor 170 may calculate a distance to the third eye area EA2 from the laser sensor 150 to detect a moving object.

In addition, the processor 170 may update the motion of the object on the fixed around view monitor image upon the detection of the moving object. For example, by changing the position of an image by using an object image on an image captured on the first eye area EA, it is possible to update the fixed around view monitor image. In this case, the processor 170 may calculate the possibility of collision according to the driving direction of a vehicle and the motion of the moving object, and display an additional image highlighting a moving object capable of colliding along with the fixed around view monitor image.

The processor 170 may also move a fixed view point VP according to the movement of the vehicle 700.

Specifically, the processor 170 may move the fixed view point VP having a certain relationship to the vehicle 700, not over the vehicle 700 simply.

For example, when there is a need to change a lane, the processor 170 fixes the view point VP onto a lane before a change and then the vehicle 700 moves forward to go to a lane after the change. Then, the view point VP on the lane before the change may move forward.

The processor 170 may calculate the position change of the vehicle 700 in order to display the position movement of the vehicle image 700i on a fixed around view point VP image, and update an image of the vehicle 700 on the fixed around view monitor image according to the position change of the vehicle 700.

Specifically, the processor 170 may use at least one of sensor information, navigation information, a distance to an object measured by the laser sensor 150, a real-time captured image and the previous image to calculate the position of the vehicle 700 on the first eye area EA and display the vehicle image 700i on the first eye area EA.

If the image of the vehicle 700 gets out of the eye area EA, the processor 170 may reset a fixed view point VP and a designated eye area EA.

The processor 170 may further display an additional image on the fixed around view monitor image. In this example, the additional image may include at least one of a parking space, a vehicle 700 prediction movement direction according to a steering change, a distance to an object, a door open area, and whether to change a lane.

For example, the processor 170 may predict the movement position of the vehicle 700 according to a steering change, determine whether or not the predicted position of the vehicle 700 is within the parking space, and further generate an additional image according to the determination.

Also, the processor 170 may further include an additional image representing a distance between an object in the eye area EA and the vehicle 700 in the fixed around view monitor image.

Also, the processor 170 may further include an additional image representing a relationship between the door open area of the vehicle 700 and an object around the vehicle so that it is possible to previously inform in the process of parking the vehicle 700 that it is difficult to open the door when it is difficult to open the door due to the object.

For example, in addition to images from simply the fixed view point VP, the processor 170 may provide information required for a driver as additional images depending on the driving situation to assist driving.

In some implementations, the processor may provide additional images that assist a driver in changing lanes on a road. For example, if the processor 170 determines that a driver is controlling the vehicle 700 to change lanes towards a destination lane, then the processor 170 may determine whether it is possible to change lanes into the destination lane, and may generate additional images based on the determination.

As a specific example, the processor 170 may calculate a distance to another vehicle that is driving on the destination lane to detect whether it is possible for the vehicle 700 to change into the destination lane. The processor 170 may then further include, in the around-view monitor image, an additional image representing whether it is possible to change a lane into the destination lane. In some implementations, the processor 170 may determine that another vehicle is driving in the destination lane within a threshold distance to the vehicle 700, and the processor 170 may thus generate a recommendation that the vehicle 700 should not change lanes into the destination lane.

In addition, the processor 170 may check a specific driving state, generate and provide an around-view monitor image or fixed around-view monitor image in the specific driving state. For example, when checking a parking space, the processor 170 may fix, as a view point VP, a point over the vehicle 700 at the time of checking the parking space and provide a fixed around-view monitor image.

Also, the processor 170 may determine a lane change intention through turn signal information, and provide an around-view monitor information. Then, the processor 170 may determine a lane change and driving intention through a steering change, and provide a fixed around-view monitor information.

For example, after determining the driving state of the vehicle 700 directly from the above information, the processor 170 may calculate and fix the optimal position of the view point in the specific driving state, generate a corresponding fixed around-view point VP image and display the generated image on the display unit 180. That, by providing the fixed around-view point VP image even without a user input, it is possible to enhance user convenience.

FIGS. 15 to 19 are diagrams for explaining a fixed around-view monitor function according to an implementation.

The process of providing the fixed around-view monitor image is described in more detail with reference to FIGS. 15 to 19.

The processor 170 may detect a specific driving state or fix a view point VP according to a user input.

Figure 15:
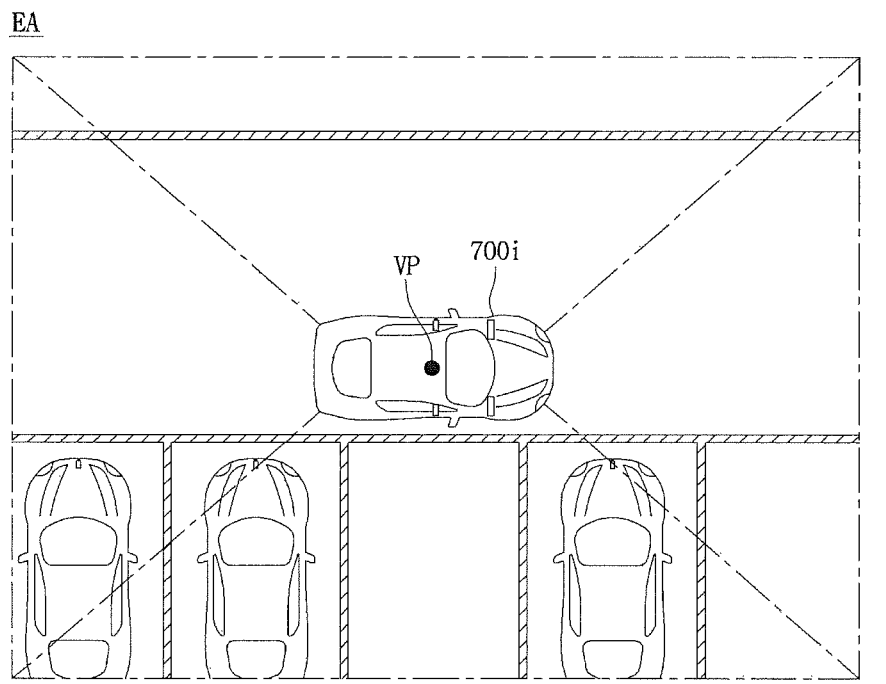
FIGS. 15 to 19 are diagrams illustrating examples of a fixed around view monitor function.
Figure 15:
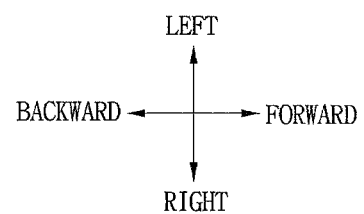

For example, referring to FIG. 15, it is possible to fix the view point VP over the vehicle 700 and fix an eye area EA at the fixed view point VP.

Next, the processor 170 may sense the driving state change of the vehicle 700 and determine the position of the vehicle image 700i. In this case, the positions of the view point VP and the eye area EA may be maintained at the fixed positions.

Figure 16:
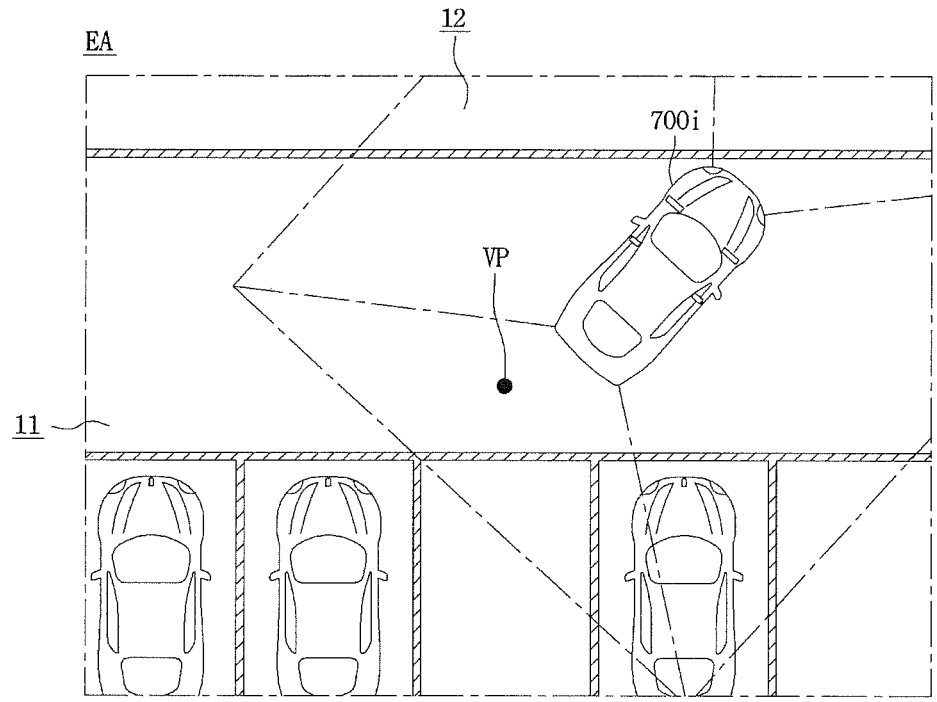

Referring to FIG. 16, it may be seen that the view point VP and the eye area EA fixed in FIG. 15 are maintained even when the heading direction of the vehicle 700 and the position of the vehicle 700 change. However, it may be seen that the vehicle image 700i moves from the center of the eye area EA as the position of the vehicle 700 changes.

In this case, it may be seen that an area captured by the camera 160 becomes a second eye area EA1 as the vehicle 700 moves.

The processor 170 may match a real-time image 12 captured on the second eye area EA1 and a previous image 11 representing the first eye area EA to generate a fixed around view monitor image of the first eye area.

The processor 170 may further generate an additional image when the fixed around view monitor image is generated.

Figure 17:
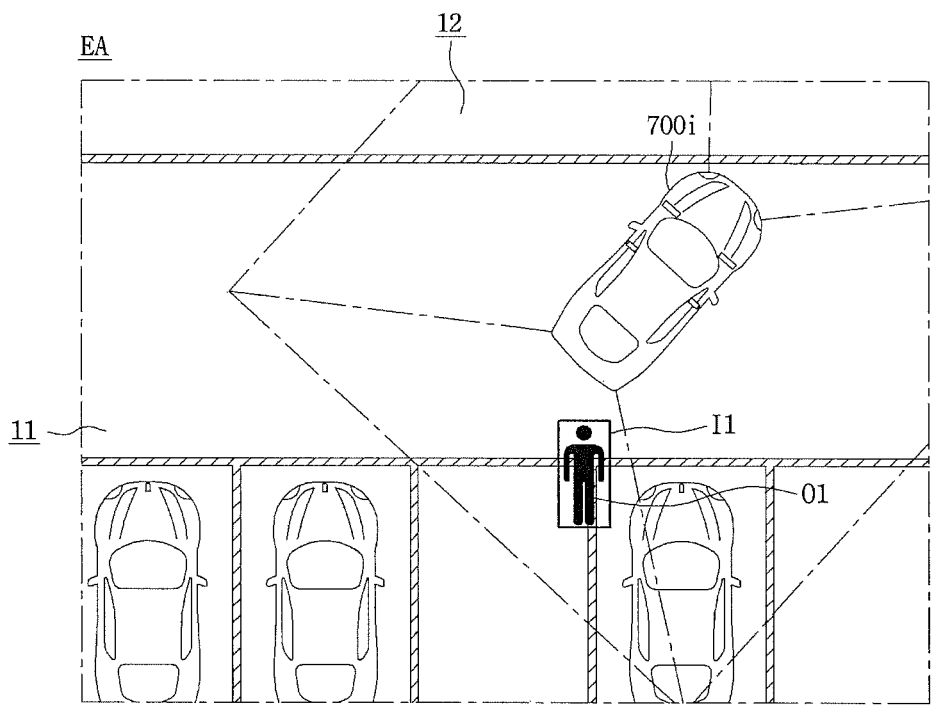

Referring to FIG. 17, the processor 170 may detect an object O1 (human being) from the real-time image 12 in the direction in which the vehicle 700 moves. In this case, the processor 170 may generate, on the real-time image 12, a first additional image I1 highlighting an object having a high possibility of collision to prevent the vehicle 700 from colliding with the object O1.

Figure 18:
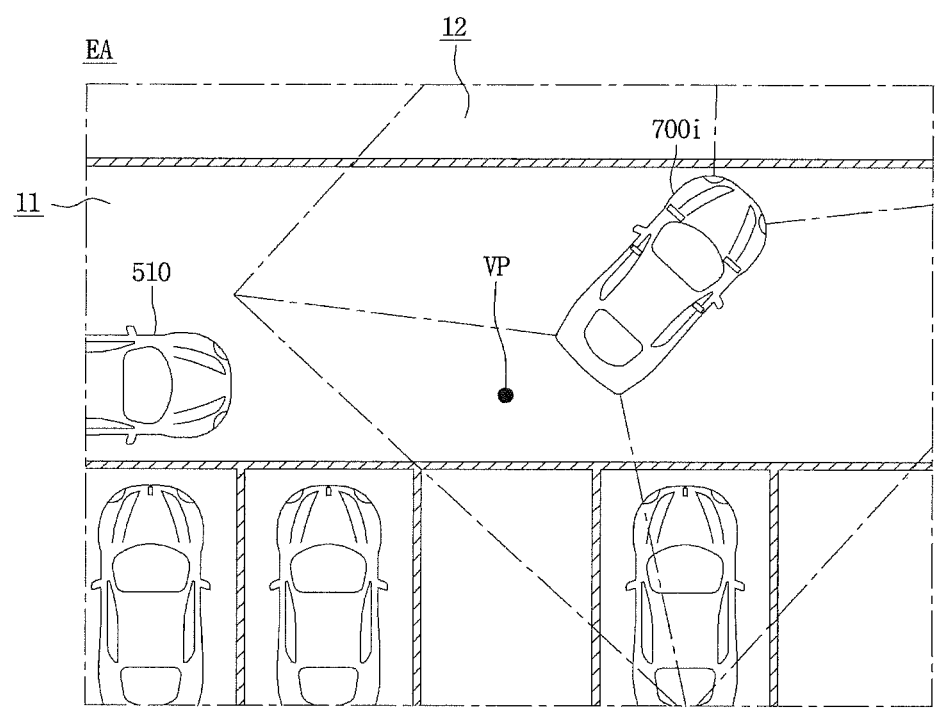

Referring to FIG. 18, the processor 170 may detect an object (another vehicle 510) on a second eye area excluding a captured portion of the first eye area, through a laser sensor 150. When an object moves to around a vehicle on the second eye area, the processor 170 may detect the movement of the vehicle with the laser sensor 150 and generate an additional image representing a moving object.

Figure 19:
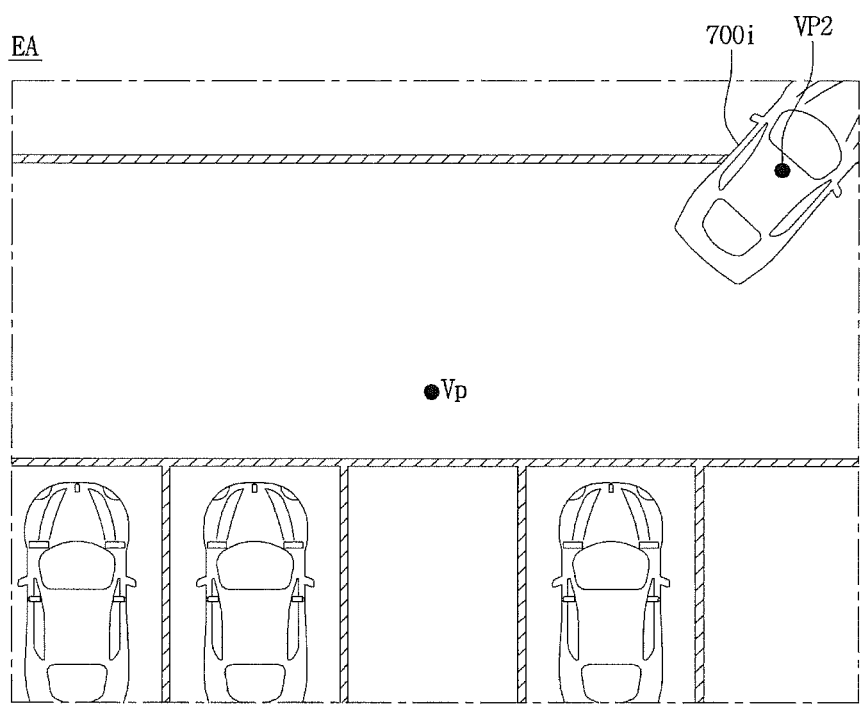

In addition, if the position of the vehicle 700 gets out of the first eye area EA, the processor 170 may reset a fixed view point VP and a designated eye area EA. Referring to FIG. 19, when it is detected that a portion of the vehicle 700 gets out of the first eye area EA, the processor 170 may change the previously fixed first fixed view point VP to a second fixed view point VP2 over the current vehicle 700 through resetting.

Specifically, when the position of the vehicle 700 gets out of a certain range from the center of the first eye area, it is possible to reset a view point to the second fixed view point VP2 so that the vehicle 700 may be at the center.

The processor 170 may be implemented by using at least one of an application specific integrated circuit (ASIC), a digital signal processor (DSP), a digital signal processing device (DSPD), a programmable logic device (PLD), a field programmable gate array (FPGA), the processor, a controller, a micro-controller, a microprocessor 170, and electrical units for executing other functions.

In addition, such a processor 170 may be controlled by a control unit or control various functions of the vehicle 700 through the control unit.

Figure 20:
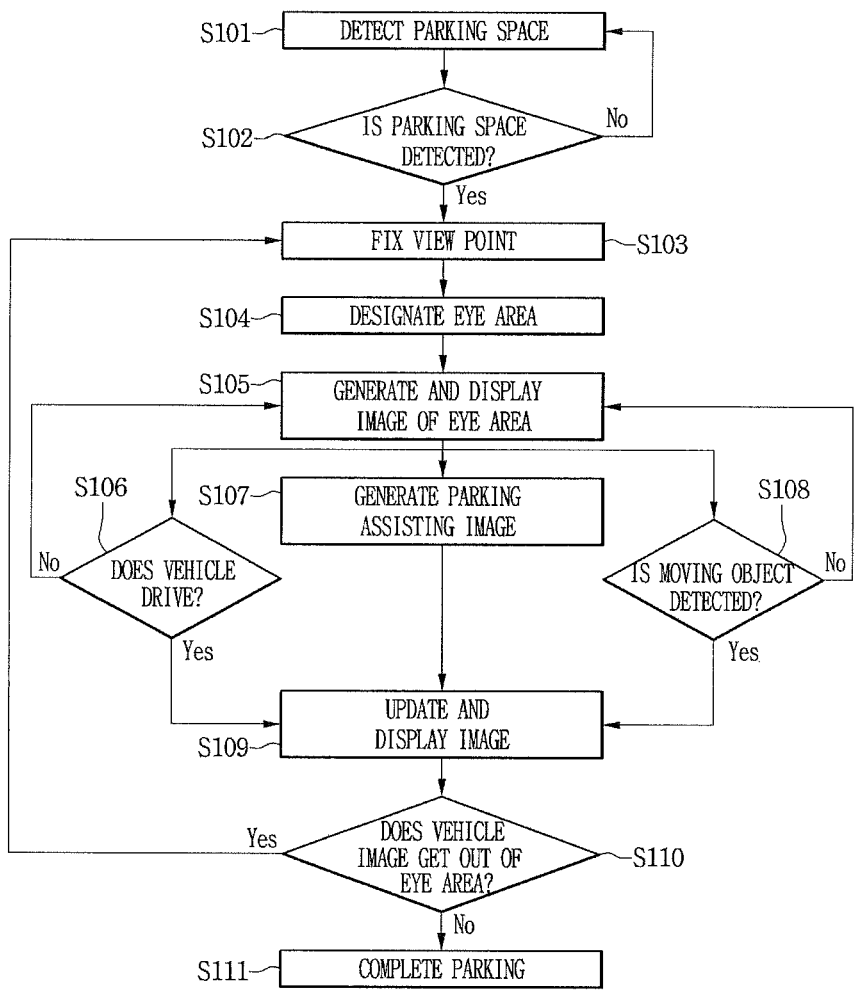
FIG. 20 is a flow chart illustrating an example of providing a fixed around view monitor image during parking of a vehicle.

FIG. 20 is a flow chart of the process of providing a fixed around-view monitor image when parking according to an implementation, and FIGS. 21 to 28 are diagrams for explaining the process of providing a fixed around-view monitor function when parking according to an implementation.

In the following, the process of providing the fixed around-view monitor image when parking is described with reference to FIGS. 20 to 28.

The processor 170 may detect a parking space in step S101.

Specifically, the processor 170 may use at least one of a captured image, map information, navigation information, sensor information, and distance information measured at a laser sensor 150 to detect a parking space.

In this case, the processor 170 may use images captured in all directions of the vehicle 700 to generate an around-view monitor image and display the generated image on a display unit 180.

In addition, the processor 170 may detect the parking space in step S102.

For example, the processor 170 may calculate the position of an object on the left or right with the laser sensor 150 and detect a certain area as a parking space when no objects are on the area.

Figure 21:
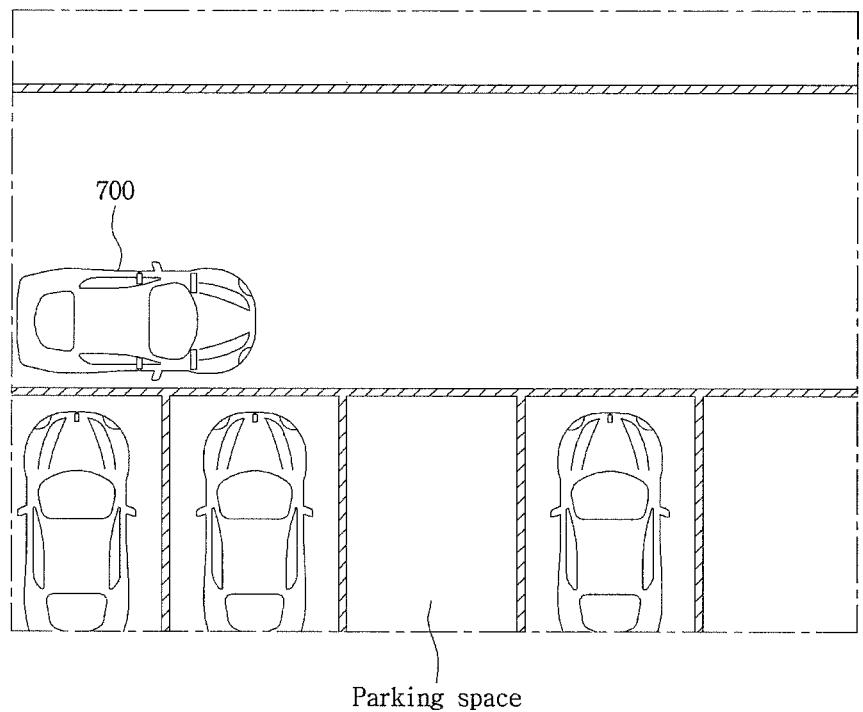
FIGS. 21 to 28 are diagrams illustrating examples of a process of providing a fixed around view monitor function during parking of a vehicle.

Specifically, referring to FIG. 21, a display apparatus 100 may irradiate a laser beam to the right of the vehicle 700 to detect the position of the object while moving forward.

When the vehicle 700 scans the parking space with the laser sensor 150 in FIG. 21, it would be possible to detect the parking space.

The processor 170 may fix a view point VP in order to provide an eye area EA for enabling easy parking in the detected parking space, when the parking space is detected, in step S103.

Figure 22:
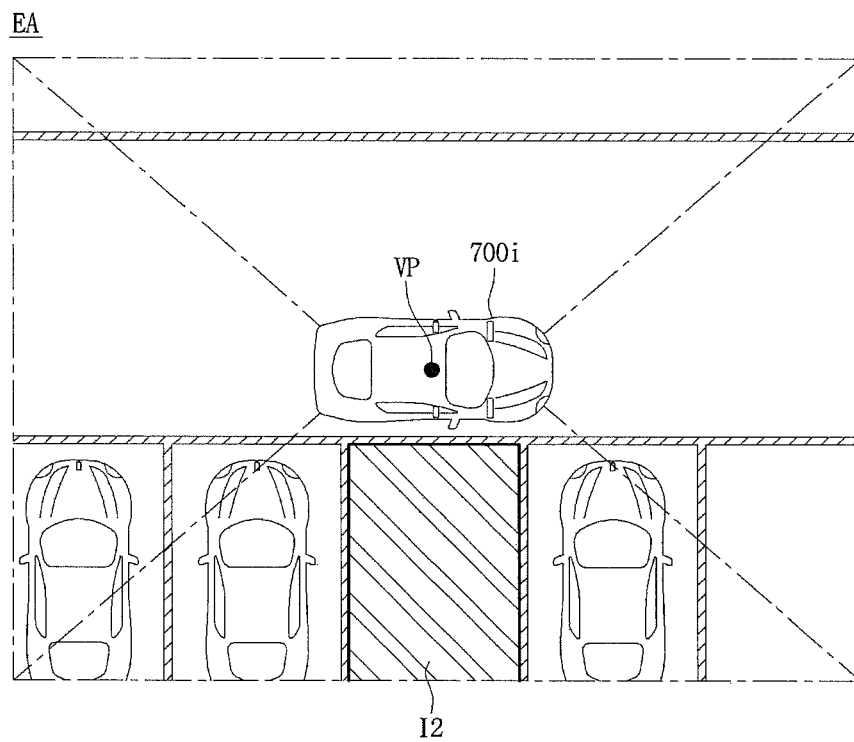
Figure 23:
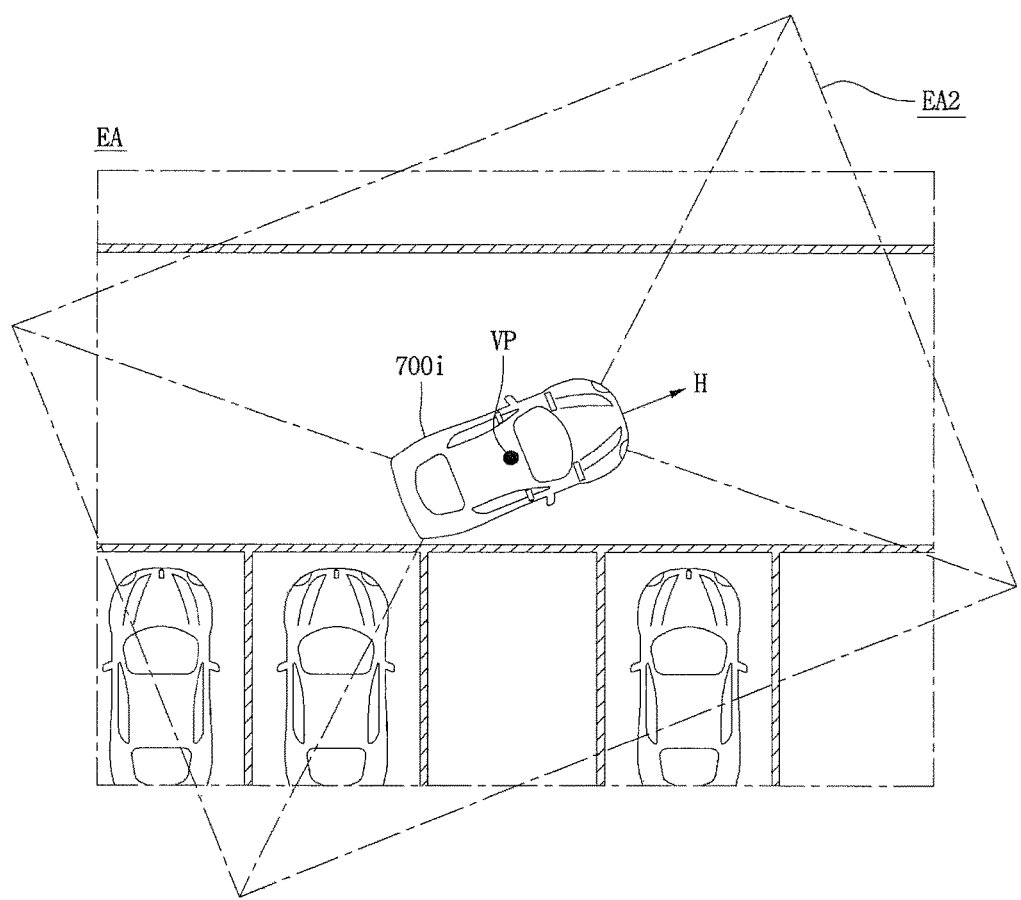
Figure 24:
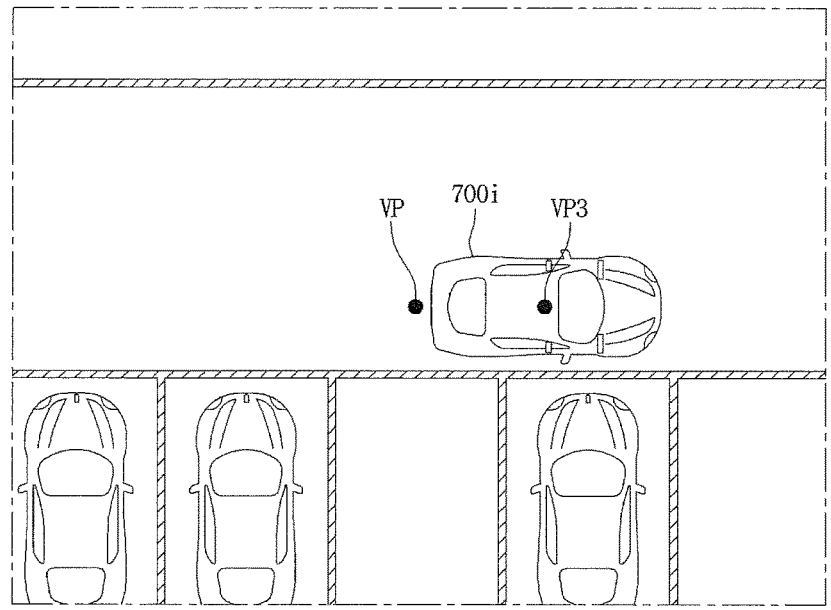
Figure 25:
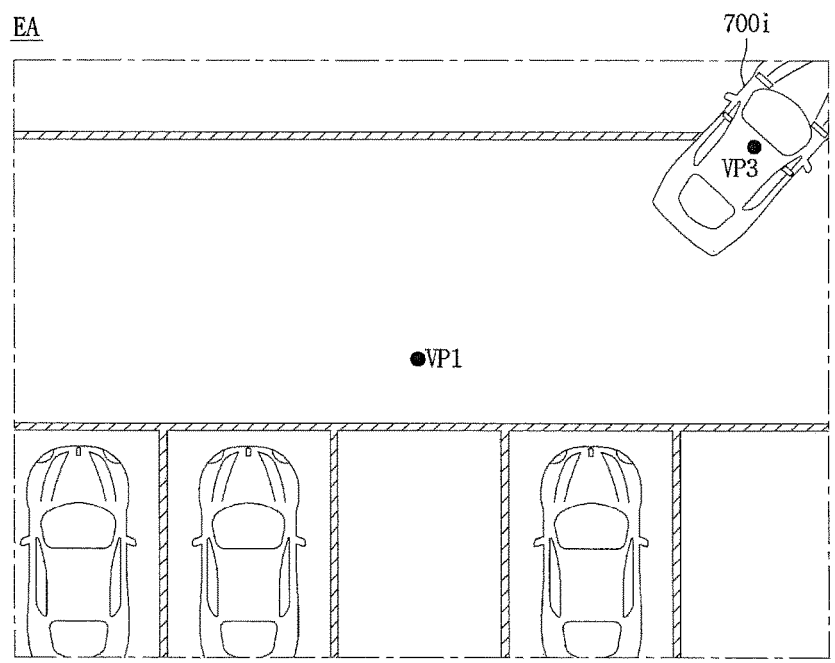

For example, referring to FIG. 22, the processor 170 may fix the view point VP and the eye area EA to a position adjacent to the parking space, when the parking space is detected. Specifically, when the top of the vehicle 700 is fixed as a view point VP upon the detection of the parking space, it is possible to secure the eye area EA required for the backward parking of the vehicle 700 because the position of the view point VP is disposed on the left of the parking space.

The processor 170 may designate the eye area EA (first eye area EA) after the fixing of the view point VP, in step S104. In this case, the first eye area EA may be defined according to the heading direction of the vehicle 700 when the view point VP is fixed.

Next, the processor 170 may generate a fixed around-view monitor image representing a designated first eye area EA, in step S105.

Specifically, the processor 170 may match a real-time captured image, a stored, previously captured image, and an image of the vehicle 700 to generate the fixed around-view monitor image.

Next, the processor 170 may detect the driving of the vehicle 700 in order to determine the position of the vehicle image 700i, in step S106.

Specifically, the processor 170 may use at least one of sensor information, navigation information, a distance to an object measured by the laser sensor 150, a real-time captured image and a previous image I1 to detect the driving of the vehicle 700 and determine the position of the vehicle image 700i on the first eye area EA. In this case, the processor 170 may maintain the view point VP and the first eye area EA even when the position or heading direction of the vehicle 700 changes according to the driving of the vehicle 700.

Since the view point of an image captured in real time according to the movement of the vehicle 700 also moves, the real-time captured image represents a second eye area EA2 and thus it is difficult to generate a fixed around view monitor image with the real-time captured image. For example, referring to FIG. 23, the heading direction changes according to the driving of the vehicle 700, so the second eye area EA2 may change. Also, referring to FIG. 24, the position of the vehicle 700 changes according to the driving of the vehicle, so the position of the view point VP3 of an image captured at the vehicle changes.

Thus, the processor 170 may match a real-time captured image, a stored, previously captured image, and an image of the vehicle 700 according to the change of a driving state to update the fixed around view monitor image, in step S109.

Specifically, the processor 170 may display a real-time captured image on which an area at which the second eye area and the first eye area EA overlap represents the second eye area, and the previous image I1 on which another area represents the first eye area EA.

The processor 170 may accurately measure the range of the second eye area of an image captured according to the position change of the vehicle 700 and match the first eye area EA and the second eye area accordingly to generate the fixed around view monitor image. In this case, a distance to an object measured by the laser sensor 150 may be used as correction data for image match.

Also, the processor 170 may use at least one of sensor information, navigation information, a distance to an object measured by the laser sensor 150, a real-time captured image and the previous image 11 to calculate the position of the vehicle 700 on the first eye area EA and display the vehicle image 700i on the first eye area EA. Thus, the vehicle image 700i may not be at the center of the fixed around view monitor image.

The processor 170 may generate an additional image for assisting parking and include the additional image in the fixed around view monitor image in step S107.

In this example, the additional image may include at least one of a parking space, a vehicle 700 prediction movement direction according to a steering change, a distance to an object, a door open area, and whether or not it is possible to park.

Figure 27:
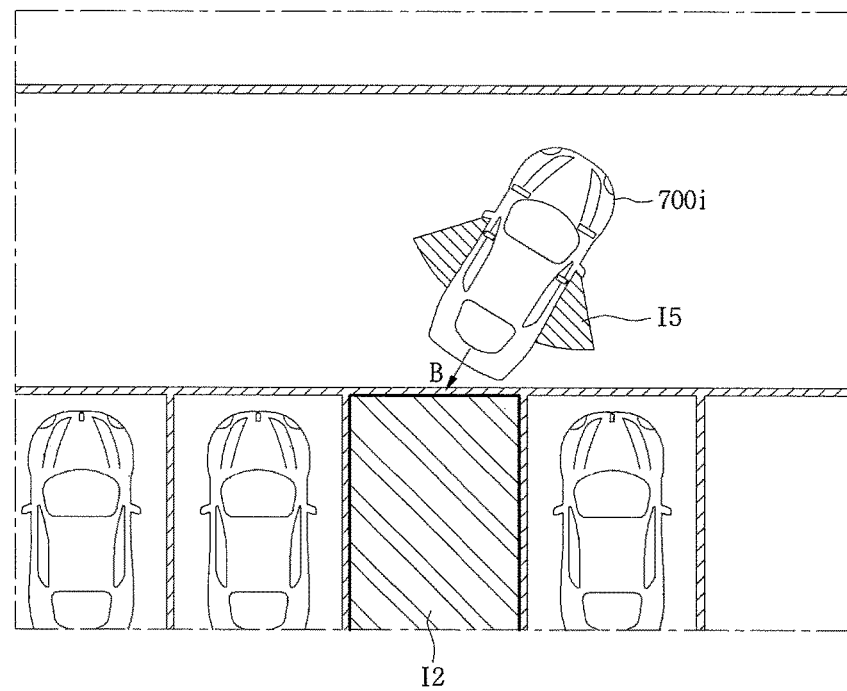
Figure 28:
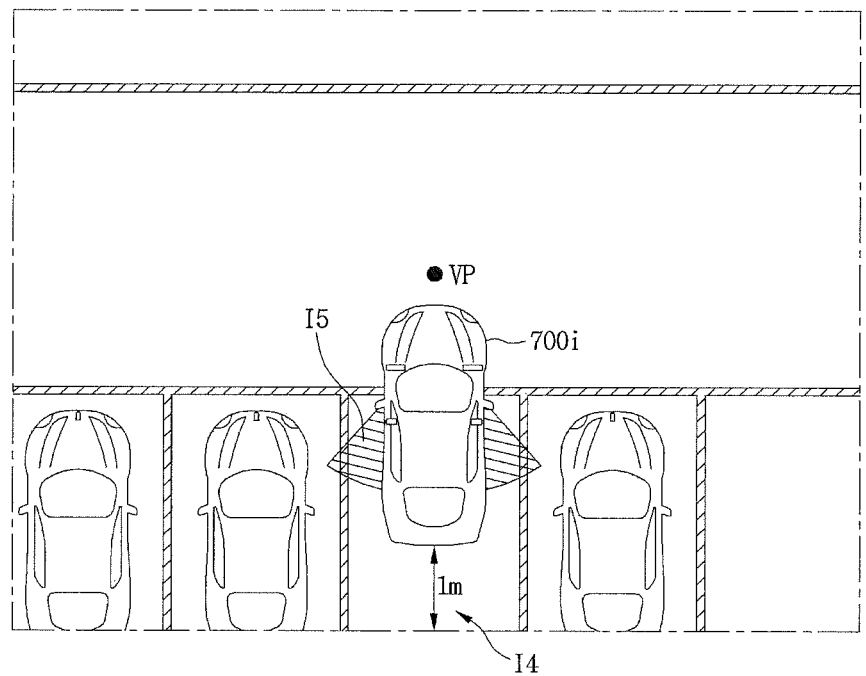

For example, when the parking space is detected as shown in FIG. 27, it is possible to generate a second additional image 12 for highlighting it. In this case, the processor 170 may predict the movement position of the vehicle 700 according to a steering change, determine whether or not the predicted position of the vehicle 700 is within the parking space, and display through the color of the second additional image 12 whether or not it is possible to park, according to the determination.

Also, the processor 170 may further include a fifth additional image I5 representing a relationship between the door open area of the vehicle 700 and an object around the vehicle so that it is possible to previously inform in the process of parking the vehicle 700 that it is difficult to open the door when it is difficult to open the door due to the object.

Also, the processor 170 may generate a direction image B representing the movement direction of the vehicle 700 according to a gear and steering change to include the image in the additional image.

Also, the processor may further include a fourth additional image 14 representing a distance between an object in the eye area EA and the vehicle 700 in the fixed around view monitor image.

The processor 170 may use a real-time captured image and/or laser sensor 150 to detect a moving object around a vehicle, and update the fixed around view monitor image accordingly, in step S108.

Specifically, the processor 170 may update the motion of the object on the fixed around view monitor image upon the detection of a moving object 01. For example, by changing the position of an image by using an object image on an image captured on the first eye area EA, it is possible to update the fixed around view monitor image. In this case, the processor 170 may calculate the possibility of collision according to the driving direction of a vehicle and the motion of the moving object 01, and display the first additional image I1 highlighting the moving object 01 capable of colliding along with the fixed around view monitor image.

Also, the processor 170 may detect whether the vehicle 700 gets out of the first eye area EA.

If the position of the vehicle 700 gets out of the first eye area EA, the processor 170 may reset a fixed view point VP and a designated eye area EA. Referring to FIG. 19, when it is detected that a portion of the vehicle 700 gets out of the first eye area EA, the processor 170 may change the first fixed view point VP previously fixed to a second fixed view point VP2 over the current vehicle 700 through resetting.

When parking is completed, the fixed around view monitor function may end.

Figure 29:
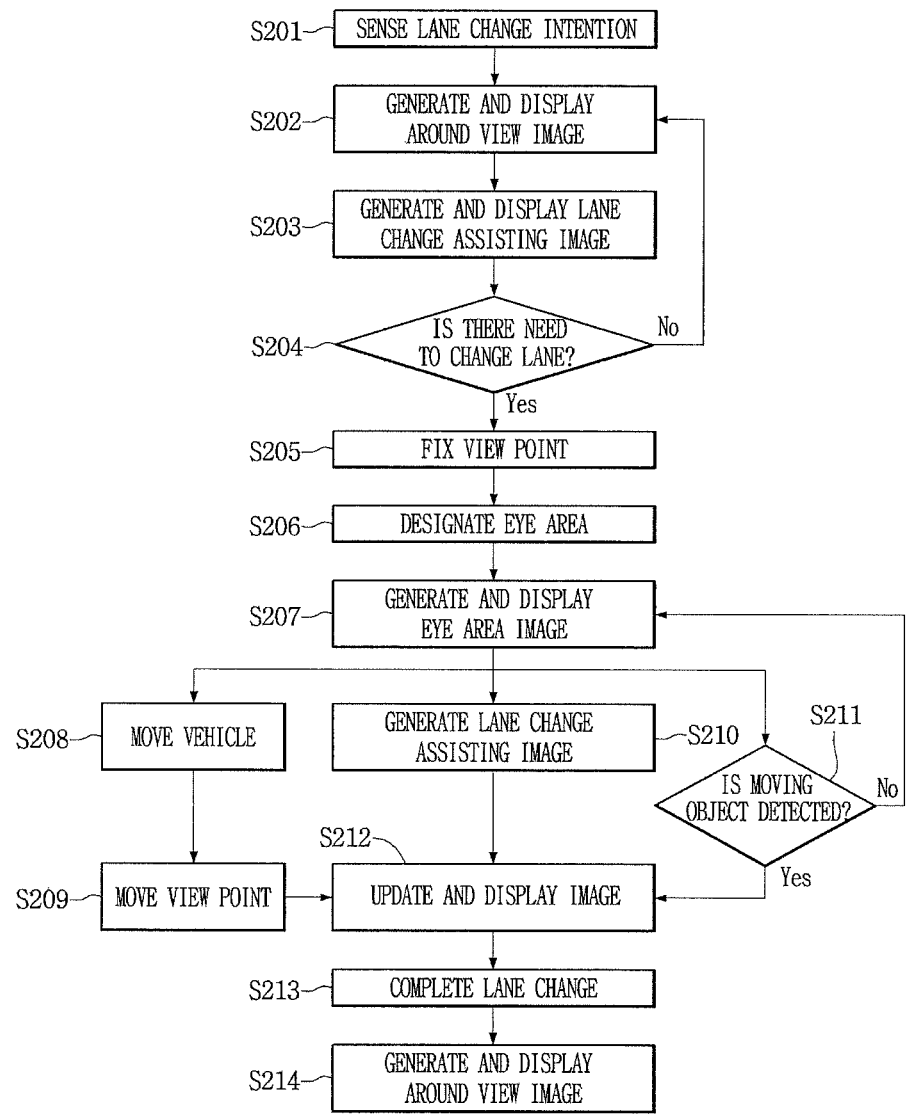
FIG. 29 is a flow chart illustrating an example of providing a fixed around view monitor image when a vehicle changes lanes.

FIG. 29 is a flow chart of the process of providing a fixed around view monitor image when changing a lane according to an implementation, and FIGS. 30 to 36 are diagrams for explaining the process of providing a fixed around view monitor function when changing a lane according to an implementation.

The fixed around view monitor function may also be provided for the change of a lane.

Referring to FIGS. 29 to 36, the processor 170 may firstly sense a lane change intention in step S201.

For example, the processor 170 may sense the lane change intention of a driver by detecting a turn signal input, a movement route in navigation information, and a driver's line of sight at a monitor unit.

Figure 30:
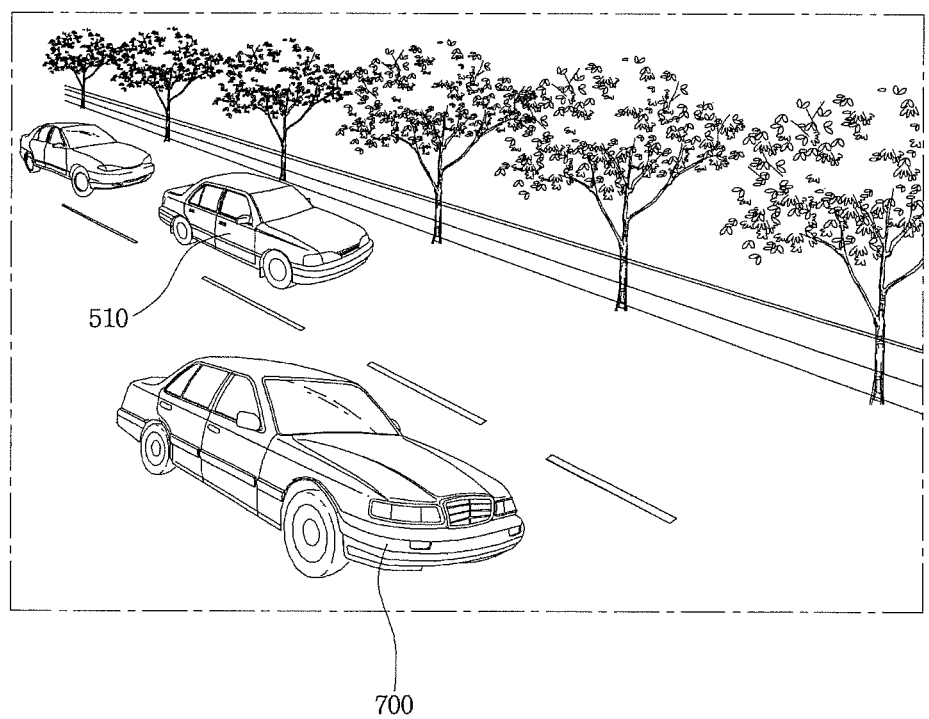
FIGS. 30 to 36 are diagrams illustrating examples of providing a fixed around view monitor function when a vehicle changes lanes.

FIG. 30 represents a situation in which a lane is changed.

Next, the processor 170 may generate an around view monitor image and display the generated image on a display unit 180, when the lane change intention is sensed, in step S202.

Figure 31:
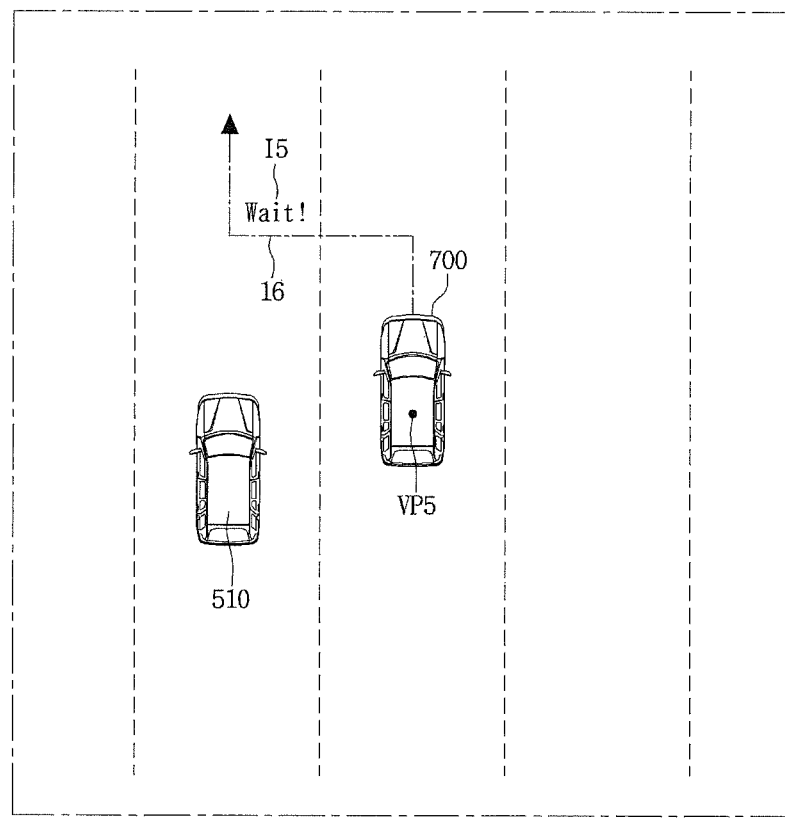
Figure 32:
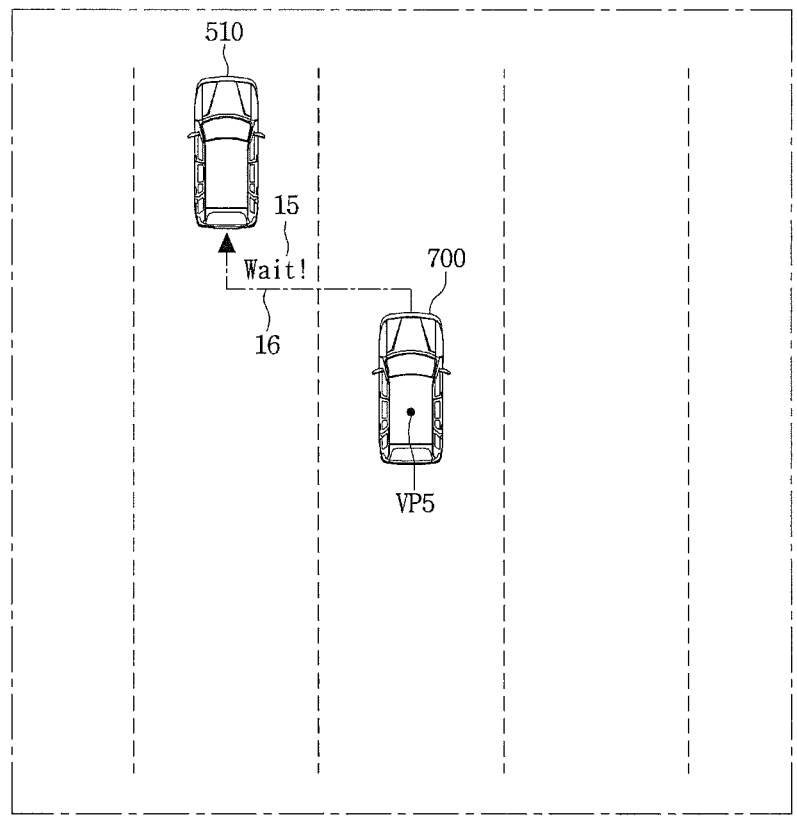

FIG. 31 represents an around view monitor image before the change of the lane. In this case, a view point VP may be over the vehicle 700, and an eye area EA may be an area from the view point VP over the vehicle 700. That is, the eye area EA may match a captured area.

The processor 170 may further generate a lane change assisting image and display the generated image along with the around view monitor image, in step S203.

Specifically, the lane change assisting image may display a fifth additional image I5 representing the safety of the lane change and a sixth additional image representing the lane change driving route of the vehicle 700.

Also, an image of another vehicle 510 is captured in real time and the image of the other vehicle may be displayed on the around view monitor image.

Figure 33:
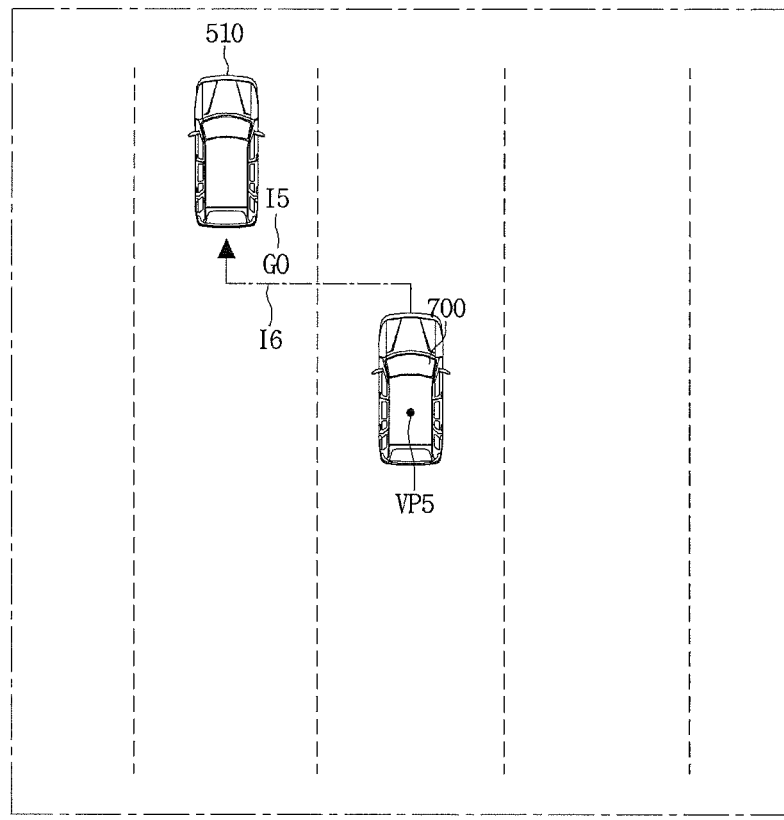
Figure 33:
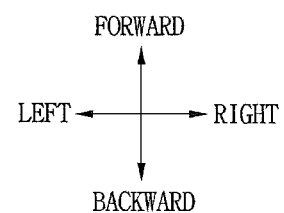

Referring to FIG. 33, when the other vehicle 510 passes the vehicle 700 and thus it is determined to be capable of change the lane, the processor 170 may display through the fifth additional image I5 that it is possible to change the lane.

The processor 170 may sense the lane change driving intention of a driver and provide a fixed around view monitor image accordingly, in step S204.

For example, when the driver changes a steering value to be equal to or larger than a preset value, the processor 170 may detect it as a lane change driving intention.

When lane change driving is sensed, the processor 170 may fix the view point VP and designate the eye area EA, in steps S205 and S206. In this case, the fixation of the view point VP may mean the fixation of a lane. Specifically, the processor 170 may fix the view point VP to a driving lane when there is a need to fix the view point. That is, the processor 170 may fix the view point VP to a lane before a change.

Next, the processor 170 may generate a fixed around view monitor image of the eye area EA in step S207.

Specifically, the processor 170 may match a real-time captured image, a stored, previously captured image, and an image of the vehicle 700 to generate the fixed around view monitor image.

Then, the processor 170 may sense the movement of the vehicle in step S208.

The processor 170 may move the view point VP according to the forward movement of the vehicle 700 in step S209. Specifically, the processor 170 may also move the view point VP forward according to the forward movement of the vehicle 700. For example, when the position of the vehicle 700 in the forward and backward directions is represented by the y-axis coordinate, it may be the same as the y-axis coordinate of the view point VP. However, when the position of the vehicle 700 in the left and right directions is represented by the x-axis coordinate, it may be the same as the x-axis coordinate of the view point VP.

The processor 170 may use at least one of sensor information, navigation information, a distance to an object measured by the laser sensor 150, a real-time captured image and a previous image 11 to detect the driving of the vehicle 700, and determine the position of the vehicle image 700i on the eye area EA according to the driving of the vehicle 700. In this case, the processor 170 may maintain the view point VP and the eye area EA even when the position or heading direction of the vehicle 700 changes according to the driving of the vehicle 700.

Figure 34:
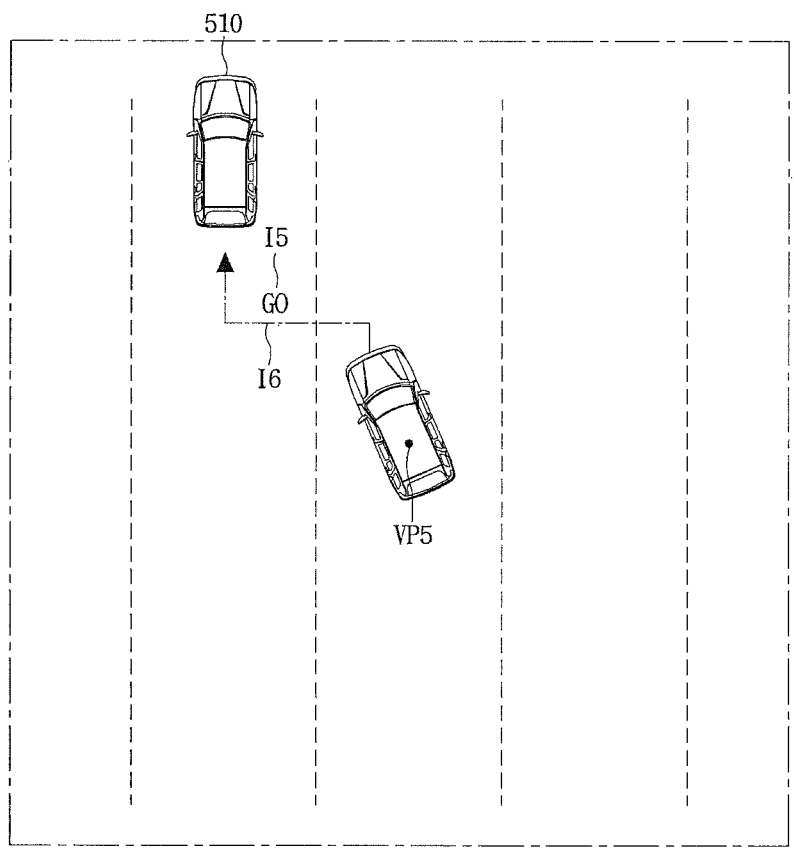
Figure 34:
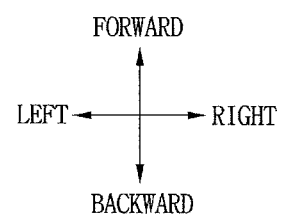

For example, referring to FIG. 34, a real-time captured area may change according to the change of the heading direction according to the driving of the vehicle 700, but the eye area EA may be maintained.

Figure 35:
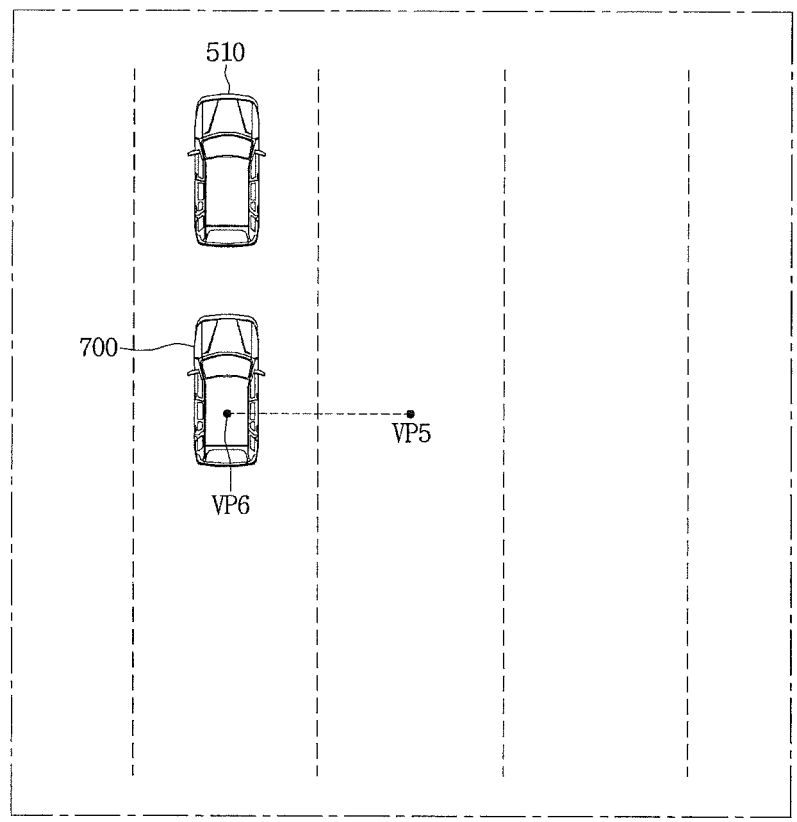
Figure 35:
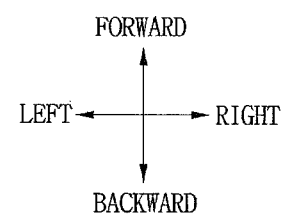
Figure 36:
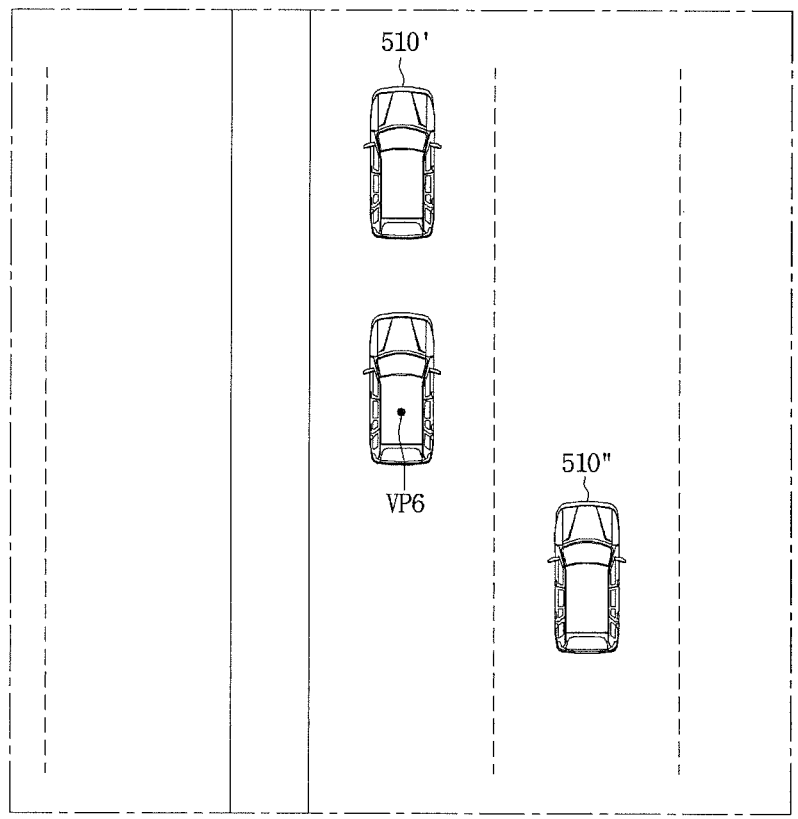
Figure 36:
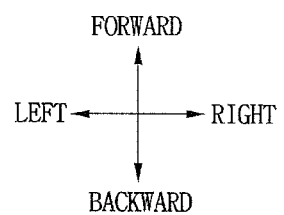

Also, referring to FIG. 35, the y-axis position of the view point VP may change according to the change of the position according to the driving of the vehicle 700 and the x-axis position may be maintained. That is, the fixed view point VP may move in the direction (y axis) parallel to the movement direction of the vehicle 700.

The processor 170 may generate a lane change assisting image and include the generated image in the fixed around view monitor image in steps S210 and S212. For example, the lane change assisting image may include a fifth additional image I5 representing whether to change a lane, a sixth additional image I6 representing a lane change route, a surrounding moving object 01, etc.

That is, the processor 170 may detect the moving object 01 through the laser sensor 150 and/or a real-time captured image and include the detected object in the fixed around view monitor image.

Figure 26:
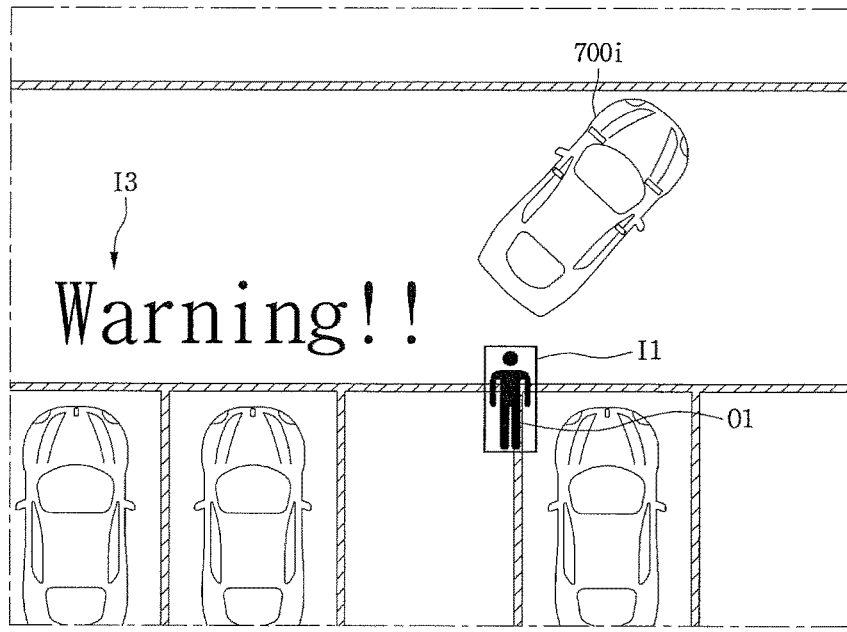

Then, when the change of the lane is completed, the processor 170 may generate and provide the around view monitor image as shown in FIG. 26, in steps S213 and S214.

Figure 37:
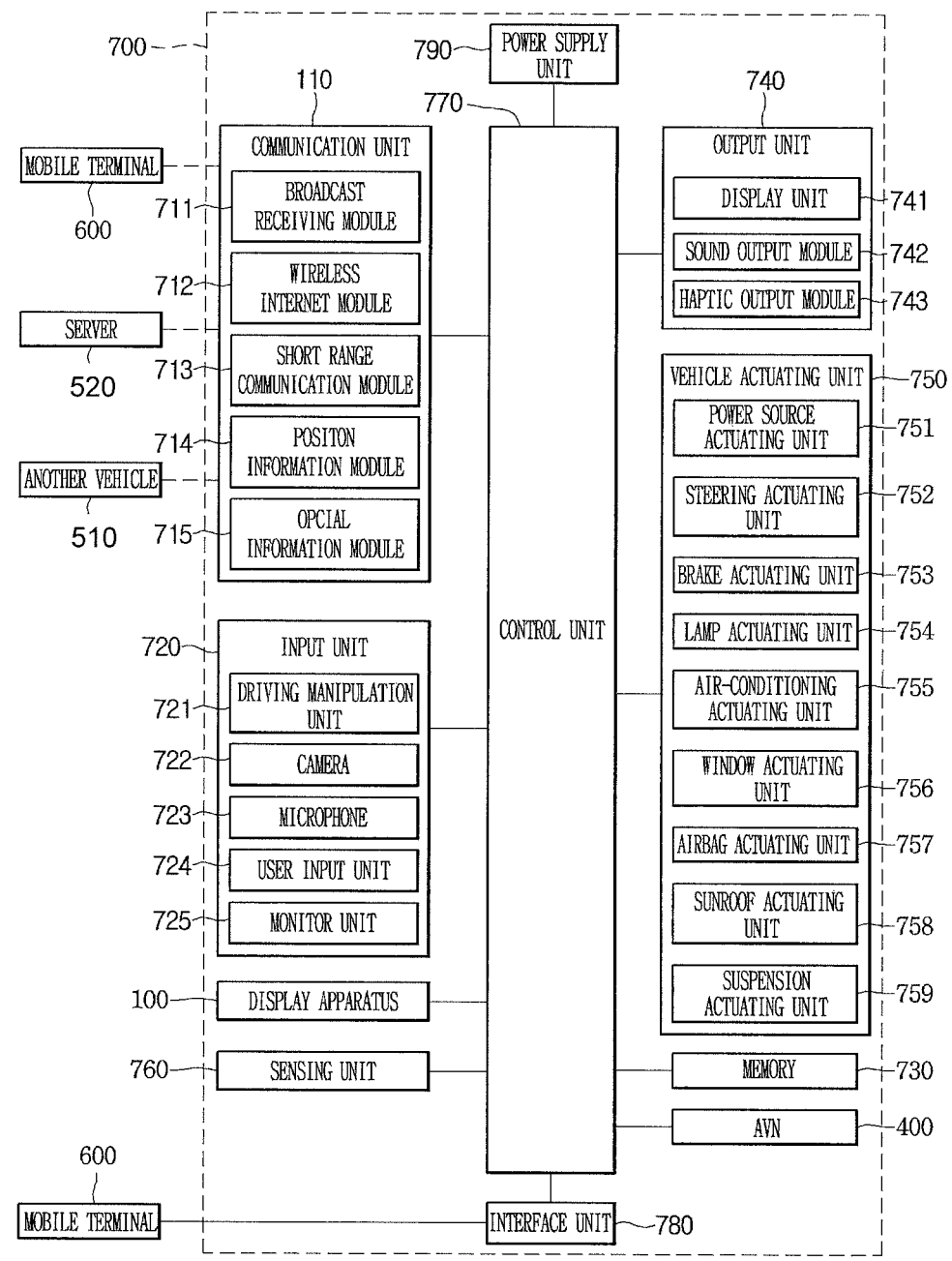
FIG. 37 is an internal block diagram illustrating an example of a vehicle.

FIG. 37 is an example of an internal block diagram of the vehicle of FIG. 1.

Such a display apparatus may be included in the vehicle.

The vehicle may include a communication unit 710, an input unit 720, a sensor unit 760, an output unit 740, a vehicle actuating unit 750, a memory 730, an interface unit 780, a control unit 770, a power supply unit 790, a display apparatus 100, and an AVN apparatus 400.

The communication unit 710 may include one or more modules that enable wireless communication between the vehicle and the mobile terminal 600, between the vehicle and an external sever 520, or between the vehicle and another vehicle 510. Also, the communication unit 710 may include one or more modules that connect the vehicle to one or more networks.

The communication unit 710 may include a broadcast receiving module 711, a wireless internet module 712, a short-range communication module 713, a position information module 714, and an optical communication module 715.

The broadcast receiving module 711 receives a broadcast signal or broadcast related information from an external broadcast management server through a broadcast channel. In this example, a broadcast include a radio or TV broadcast.

The wireless internet module 712 indicates a module for wireless internet access and may be built into or external to the vehicle. The wireless internet module 712 is configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 712 transmits/receives data according to at least one wireless internet technology including internet technologies not listed above. For example, the wireless internet module 712 may exchange data with the external server 520 wirelessly. The wireless internet module 712 may receive weather information or road traffic information (e.g., TPEG) from the external server 520.

The short-range communication module 713 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

Such a short-range communication module 713 may form a Wireless Area Network (WAN) to perform short-range communication between the vehicle and at least one external device. For example, the short-range communication module 713 may exchange data with the mobile terminal 600. The short-range communication module 713 may receive weather information or road traffic information (e.g., TPEG) from the mobile terminal 600. If a driver gets in the vehicle, the mobile terminal 600 of the driver and the vehicle may perform pairing on each other automatically or by the execution of an application by the driver.

The position information module 714 is a module for acquiring the position of the vehicle and includes a GPS module as a typical example. For example, the vehicle may use a signal transmitted by a GPS satellite to acquire the position of the vehicle, when the GPS module is used.

The optical communication module 715 may include a light transmission unit and a light reception unit.

The light reception unit may convert a light signal into an electrical signal to receive information. The light reception unit may include a photo diode (PD) for receiving light. The PD may convert light into an electrical signal. For example, the light reception unit may receive information on the front vehicle through light emitted from a light source that is included in the front vehicle.

The light transmission unit may include at least one light-emitting element for converting an electrical signal into a light signal. In this example, the light-emitting element may be a light-emitting diode (LED). The light transmission unit may convert an electrical signal into a light signal to transmit the light signal to the outside. For example, the light transmission unit may transmit the light signal to the outside through the on/off of the light-emitting element corresponding to a predetermined frequency. According to an implementation, the light transmission unit may include a plurality of light-emitting element arrays. According to an implementation, the light transmission unit may be integrated into a lamp that is installed at the vehicle. For example, the light transmission unit may be at least one of a headlight, a taillight, a stop lamp, a turn signal, and a sidelight. For example, the optical communication module 715 may exchange data with the other vehicle 510 through optical communication.

The input unit 720 may include the driving manipulation unit 721, a camera 160, a microphone 723, and a user input unit 724.

The driving manipulation unit 721 receives a driver input for driving the vehicle. (See FIG. 2 for the following description.) The driving manipulation unit 721 may include the steering input unit 721A, a shift input unit 721D, an acceleration input unit 721C, and a brake input unit 721B.

The steering input unit 721A receives an input for the driving direction of the vehicle from a driver. The steering input unit 721A may be formed in the form of a wheel so that a steering input may be performed by rotation. According to an implementation, the steering input unit 721A may also be formed as a touch screen, touch pad or button.

The shift input unit 721D receives an input for the parking P, driving D, neutrality N, and rear movement R of the vehicle from the driver. The shift input unit 721D may be formed in the form of a lever. According to an implementation, the shift input unit 721D may also be formed as a touch screen, touch pad or button.

The acceleration input unit 721C receives an input for the acceleration of the vehicle from the driver. The brake input unit 721B receives an input for the speed decrease of the vehicle from the driver. The acceleration input unit 721C and the brake input unit 721B may be formed in the form of a pedal. According to an implementation, the acceleration input unit 721C or the brake input unit 721B may also be formed as a touch screen, touch pad or button.

The camera 722 may include an image sensor and an image processing module. The camera 722 may process a still image or video that is obtained by an image sensor (e.g., CMOS or CCD). The image processing module may process the still image or video acquired by the image sensor to extract necessary information and transmit the extracted information to the control unit 770. The vehicle may include the camera 722 that captures images in front of the vehicle or images around the vehicle, and the monitor unit 725 that captures an image of the interior of the vehicle.

The monitor unit 725 may acquire an image of a passenger. The monitor unit 725 may acquire the image of the passenger for biometrics.

Although FIG. 31 shows that the monitor unit 725 and the camera 722 are included in the input unit, the camera 722 may also be included in the display apparatus as described above.

The microphone 723 may process an external sound signal into electrical data. The processed data may be used in various methods according to a function that is executed at the vehicle. The microphone 723 may convert a driver's voice command into electrical data. The electrical data obtained through conversion may be transmitted to the control unit 770.

According to an implementation, the camera 722 or the microphone 723 may also be a component that is included in the sensing unit 760, and not in the input unit 720.

The user input unit 724 receives information from the driver. When information is input through the user input unit 724, the control unit 770 may control the operation of the vehicle corresponding to the input information. The user input unit 724 may include a touch-type input unit or mechanical input unit. According to an implementation, the user input unit 724 may be disposed at a region of a steering wheel. In this case, a driver may manipulate the user input unit 724 with his or her finger, holding the steering wheel.

The sensing unit 760 senses a signal relating to the driving of the vehicle. To this end, the sensing unit 760 may include a wheel sensor, a speed sensor, a tilt sensor, a weight sensor, a heading sensor, a yaw sensor, a gyro sensor, a position module, a vehicle forward/backward movement sensor, a battery sensor, a fuel sensor, a tire sensor, a steering sensor by steering wheel rotation, a vehicle temperature sensor, a vehicle humidity sensor, an ultrasonic sensor, a radar, a Lidar, and so on.

Thus, the sensing unit 760 may acquire sensing signals for vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, vehicle temperature information, vehicle humidity information, steering wheel rotation angle, and so on.

The sensing unit 760 may further include an acceleration pedal sensor, a barometric pressure sensor, an engine speed sensor, an Air Flow Sensor (AFS), an Air Temperature Sensor (ATS), a Water Temperature Sensor (WTS), a Throttle Position Sensor (TPS), a TDC sensor, a Crank Angle Sensor (CAS), and so on.

The sensing unit 760 may include a biometric recognition information sensing unit. The biometric recognition information sensing unit senses and acquires biometric recognition information on a passenger. The biometric recognition information may include fingerprint information, iris-scan information, retina-scan information, hand geometry information, facial recognition information, and voice recognition information. The biometric recognition information sensing unit may include a sensor that senses biometric recognition information of the passenger. In this case, the monitor unit 725 and the microphone 723 may operate as sensors. The biometric recognition information sensing unit may acquire hand geometry information and facial recognition information through the monitor unit 725.

The output unit 740 is used for outputting information processed by the control unit 770 and may include the display unit 741, the sound output unit 742, and the haptic output unit 743.

The display unit 741 may display information processed by the control unit 770. For example, the display unit 741 may display vehicle related information. In this example, the vehicle related information may include vehicle control information for direct control over the vehicle or driver assistance information for a driving guide for a driver. Also, the vehicle related information may include vehicle state information that indicates the current state of the vehicle, or vehicle operation information relating to the operation of the vehicle.

The display unit 741 may include at least one of an LCD, a TFT LCD, an OLED, a flexible display, a 3D display, and an e-ink display.

The display unit 741 may form a mutual layer structure with a touch sensor or be integrally formed to implement a touch screen. The touch screen may function as the user input unit that provides an input interface between the vehicle and the driver, and also provide an output interface between the vehicle and the driver. In this case, the display unit 741 may include a touch sensor sensing a touch of the display unit 741 to be capable of receiving a control command by the touch. Accordingly, when the display unit 741 is touched, the touch sensor senses the touch, and the control unit 770 may generate, based on the touch, a control command corresponding to the touch. A thing input by the touch may be a letter, a number, or a menu item that may be instructed or designated in various modes.

The display unit 741 may include a cluster so that a driver may see vehicle state information or vehicle operation information simultaneously with driving. The cluster may be located on the dashboard. In this case, the driver may see information displayed on the cluster, maintaining forward view.

According to an implementation, the display unit 741 may be implemented as a HUD. When the display unit 741 is implemented as the HUD, it is possible to output information through a transparent display that is installed on the windshield. Alternatively, the display unit 741 may include a projection module to output information by using image that is projected onto the windshield.

The sound output unit 742 converts an electrical signal from the control unit 770 into an audio signal and outputs the audio signal. To this end, the sound output unit 742 may include a speaker and so on. The sound output unit 742 may also output sound corresponding to the operation of the user input unit 724.

The haptic output unit 743 generates a haptic output. For example, the haptic output unit 743 may enable a steering wheel, a safety belt and a seat to vibrate so that a driver may recognize an output.

The vehicle actuating unit 750 may control the operations of various apparatuses of the vehicle. The vehicle actuating unit 750 may include a power source actuating unit 751, a steering actuating unit 752, a brake actuating unit 753, a lamp actuating unit 754, an air-conditioning actuating unit 755, a window actuating unit 756, an airbag actuating unit 757, a sunroof actuating unit 758, and a suspension actuating unit 759.

The power source actuating unit 751 may perform electronic control over the power source in the vehicle.

For example, when the power source is a fossil fuel based engine (not shown), the power source actuating unit 751 may perform electronic control over the engine. Thus, it is possible to control the output torque of the engine. When the power source actuating unit 751 is the engine, it is possible to restrict the output torque of the engine to restrict the speed of the vehicle.

As another example, when the power source is an electricity based motor (not shown), the power source actuating unit 751 may control the motor. Thus, it is possible to control the speed, torque and so on of the motor.

The steering actuating unit 752 may perform electronic control over a steering apparatus in the vehicle. Thus, it is possible to change the driving direction of the vehicle.

The brake actuating unit 753 may perform electronic control over a brake apparatus (not shown) in the vehicle. For example, it is possible to control the operation of a brake installed at a wheel to decrease the speed of the vehicle. As another example, by enabling brakes disposed at the left wheel and the right wheel respectively to perform different operations, it is possible to adjust the driving direction of the vehicle to the left or to the right.

The lamp actuating unit 754 may control the turn on/off of lamps that are disposed inside and outside the vehicle. Also, it is possible to control the intensity, direction and so on of light emitted from the lamp. For example, it is possible to control a turn signal lamp, a brake lamp, and so on.

The air-conditioning actuating unit 755 may perform electronic control over an air conditioner (not shown) in the vehicle. For example, when the temperature inside the vehicle is high, it is possible to operate the air conditioner so that cold air is supplied into the vehicle.

The window actuating unit 756 may perform electronic control over a window apparatus in the vehicle. For example, it is possible to open or close left and right windows of the vehicle.

The airbag actuating unit 757 may perform electronic control over an airbag apparatus in the vehicle. For example, it is possible to operate an airbag in a risky situation.

The sunroof actuating unit 758 may perform electronic control over a sunroof apparatus (not shown) in the vehicle. For example, it is possible to open or close the sunroof.

The suspension actuating unit 759 may perform electronic control over a suspension apparatus (not shown) in the vehicle. For example, when the road surface is uneven, it is possible to control a suspension apparatus to reduce the vibration of the vehicle.

The memory 730 is electrically connected to the control unit 770. The memory 730 may store fundamental data on units, control data for operation control over the units, and input and output data. The memory 730 may be various storage devices, such as a ROM, RAM, EPROM, flash drive, and hard drive that are hardware. The memory 730 may store various pieces of data for the overall operations of the vehicle, such as programs for processing or controlling by the control unit 770.

The interface unit 780 may function as a path to various kinds of external devices that are connected to the vehicle. For example, the interface unit 780 may include a port connectable to the mobile terminal 600 and be connected to the mobile terminal 600 through the port. In this case, the interface unit 780 may exchange data with the mobile terminal 600.

The interface unit 780 may function as a path through which electrical energy is supplied to the mobile terminal 600. When the mobile terminal 600 is electrically connected to the interface unit 780, the interface unit 780 supplies electrical energy supplied from the power supply unit 790 to the mobile terminal 600 according to the control of the control unit 770.

The control unit 770 may control the overall operation of each unit in the vehicle. The control unit 770 may be named an electronic control unit (ECU).

Such a control unit 770 may execute a function corresponding to a transmitted signal, according to the execution signal transmission of the display apparatus.

The control unit 770 may be implemented by using at least one of an ASIC, a DSP, a DSPD, a PLD, an FPGA, a processor, a controller, a micro-controller, a microprocessor, and other electrical units for executing functions.

The control unit 770 may perform the role of the above-described processor 170. That is, the processor 170 of the display apparatus may be set directly to the control unit 770 of the vehicle. In such an implementation, it may be understood that the display apparatus refers to some components of the vehicle.

Alternatively, the control unit 770 may also control components to transmit information requested by the processor 170.

The power supply unit 790 may supply power required for the operation of each component according to the control of the control unit 770. In particular, the power supply unit 790 may receive power from a battery (not shown) in the vehicle.

The AVN apparatus 400 may exchange data with the control unit 770. The control unit 770 may receive navigation information from the AVN apparatus 400 or a separate navigation apparatus (not shown). In this example, the navigation information may include set destination information, route information according to the destination, vehicle driving related map information, or vehicle position information.

Since the driver assistance apparatus according to an implementation proposes a function necessary for a user depending on a driving situation, maintain user's driving attention, and may be easily performed, there are advantages in that safe driving is possible and it is possible to increase the convenience of the driver.

Specifically, the driver assistance apparatus according to an implementation may enhance driving safety by providing a partial self-driving function of performing special driving that a user has a difficulty.

Also, since the driver assistance apparatus according to an implementation may receive an execution input through a gesture input unit, a user may easily perform various execution inputs, maintaining driving attention.

Also, the driver assistance apparatus according to an implementation proposes a necessary function through a display unit, in which case the driver assistance apparatus enables a convenience function to be intuitively understood with a simple display and also enhances driving safety because the user may keep eyes forward.

The characteristics, structures, and effects described in the implementations above are included in at least one implementation but are not limited to one implementation. Furthermore, the characteristic, structure, and effect illustrated in each implementation may be combined or modified for other implementations by a person skilled in the art. Thus, it would be construed that contents related to such a combination and such a variation are included in the scope of implementations.

Implementations are mostly described above. However, they are only examples and do not limit the inventive concept. A person skilled in the art may appreciate that many variations and applications not presented above may be implemented without departing from the essential characteristic of implementations. For example, each component particularly represented in implementations may be varied. In addition, it should be construed that differences related to such a variation and such an application are included in the scope of the inventive concept defined in the following claims.

What is claimed is:

1. A display apparatus having an around-view monitor function, the display apparatus comprising:
   a camera configured to acquire an image by capturing an image of a view around a vehicle;
   a memory configured to store the captured image;
   a distance sensor configured to measure a distance to an object or a position relative to the object;
   a processor configured to:
      fix a view point for the around-view monitor function;
      designate a viewing area at the fixed view point for the around-view monitor function; and
      generate a fixed around-view monitor image representing the viewing area at the fixed view point; and
   a display unit configured to display the fixed around-view monitor image,
   wherein the processor further configured to;
      obtain, from the camera, a first image representing a first viewing area at a first fixed view point and store the first image in the memory;
      display, based on the first image, a first fixed around-view monitor image representing the first viewing area;
      measure, through the distance sensor, a first position of the vehicle relative to the object;
      obtain, from the camera and as the vehicle moves, a second image representing a second viewing area;
      measure, through the distance sensor, a second position of the vehicle relative to the object;
      detect an overlap area overlapped with the first viewing area among the second viewing area;
      match the second image for the overlap area and the first image for an area that is not overlapped with the second viewing area, to generate a second fixed around-view monitor image representing the first viewing area; and
      cause the display unit to display the second fixed around-view monitor image.

2. The display apparatus according to claim 1, wherein the processor is further configured to:
   determine the distance to the object based on the distance sensor; and
   detect a moving object based on the determined distance to the object.

3. The display apparatus according to claim 2, wherein the processor is further configured to, based on detecting the moving object, update a motion of the moving object on the fixed around-view monitor image.

4. The display apparatus according to claim 3, wherein the processor is further configured to:
   update an image of the vehicle on the second fixed around-view monitor image according to the position change from the first position to the second position of the vehicle.

5. The display apparatus according to claim 1, wherein the processor is further configured to:
   determine a likelihood of collision according to a driving direction of the vehicle and the motion of the moving object; and
   include, in the fixed around view monitor image and based on the determined likelihood of collision, an additional image that includes an indication of the moving object that is likely to collide with the vehicle.

6. The display apparatus according to claim 1, wherein the processor is further configured to:
   determine that the vehicle is parking or changing lanes;
   automatically fix the view point based on the determination that the vehicle is parking or changing lanes; and
   generate the fixed around view monitor image based on the automatically fixed view point.

7. The display apparatus according to claim 1, wherein the processor is further configured to maintain the view point and the viewing area while the vehicle moves.

8. The display apparatus according to claim 7, wherein the processor is further configured to:
   detect a parking space in a vicinity of the vehicle; and
   fix the view point to a point located over the vehicle based on detecting the parking space.

9. The display apparatus according to claim 8, wherein the processor is further configured to:
   determine sensor information comprising at least one of steering, acceleration pedal, or gear shift change;
   determine a prediction for a movement position of the vehicle according to the determined sensor information;
   determine, based on the prediction for the movement position of the vehicle, whether the vehicle is expected to park within the parking space; and include, in the fixed around-view monitor image, an additional image according to a determination that the vehicle is expected to park within the parking space.

10. The display apparatus according to claim 7, wherein the processor is further configured to include, in the fixed around-view monitor image, an additional image representing the distance between the object and the vehicle.

11. The display apparatus according to claim 7, wherein the processor is further configured to:
   determine that the image of the vehicle is not within the viewing area; and
   reset the view point and the viewing area based on the determination that the image of the vehicle is not within the viewing area.

12. The display apparatus according to claim 7, wherein the processor is further configured to:
   determine an image representing a door open area of the vehicle; and
   include, in the image of the vehicle, the image representing the door open area of the vehicle.

13. The display apparatus according to claim 12, wherein the processor is further configured to:
   determine an image representing a relationship between the door open area of the vehicle and an object outside of the vehicle; and
   include, in the image of the vehicle, the image representing the relationship between the door open area of the vehicle and the object outside of the vehicle.

14. The display apparatus according to claim 1, wherein the processor is further configured to:
   determine a driving lane of the vehicle; and
   move the view point according to the determined driving lane of the vehicle.

15. The display apparatus according to claim 14, wherein the processor is further configured to:
   fix the view point to the determined driving lane of the vehicle; and
   maintain the view point and the viewing area while the vehicle changes from the driving lane to another lane.

16. The display apparatus according to claim 14, wherein the processor is further configured to:
   determine a lane change of the vehicle while providing the around-view monitor image; and
   fix the view point to the driving lane of the vehicle based on sensing the lane change of the vehicle.

17. The display apparatus according to claim 16, wherein the processor is further configured to:
   determine that the lane change of the vehicle has been completed; and
   update the around-view monitor image based on a determination that the lane change of the vehicle has been completed.

18. The display apparatus according to claim 14, wherein the processor is further configured to:
   determine a distance to another vehicle that drives in a destination lane;
   determine whether the distance to the other vehicle that drives in the destination lane is smaller than a threshold distance; and
   determine, from the fixed around-view monitor image and based on the determination of whether the distance to the other vehicle that drives in the destination lane is smaller than the threshold distance, a recommendation of whether to change lanes into the destination lane.

19. The display apparatus according to claim 18, wherein the processor is further configured to:
   determine an image representing the recommendation of whether to change lanes into the destination lane; and
   include, in the fixed around-view monitor image, the image representing the recommendation of whether to change lanes into the destination lane.

20. The display apparatus according to claim 1, wherein the processor is configured to display the image of the vehicle such that the image of the vehicle is located off-center in the image of the viewing area.

21. The display apparatus according to claim 1, wherein the processor is configured to change a position of the image of the vehicle in the image of the viewing area according to movement of the vehicle.

22. A vehicle comprising the display apparatus according to claim 1.

* * * * *